US012583797B2

(12) United States Patent
Can et al.

(10) Patent No.: US 12,583,797 B2
(45) Date of Patent: Mar. 24, 2026

(54) SINTERED POLYCRYSTALLINE CUBIC BORON NITRIDE MATERIAL

(71) Applicant: Element Six (UK) Limited, Oxfordshire (GB)

(72) Inventors: Antionette Can, Oxfordshire (GB); Xiaoxue Zhang, Oxfordshire (GB); Volodymyr Bushlya, Lund (SE); Denis Stratiichuk, Kiev (UA); Kateryna Slipchenko, Kiev (UA); Alexander Osipov, Kiev (UA); Igor Petrusha, Kiev (UA); Vladimir Turkevich, Kiev (UA)

(73) Assignee: Element Six (UK) Limited, Oxfordshire (GB)

( * ) Notice: Subject to any disclaimer, the term of this patent is extended or adjusted under 35 U.S.C. 154(b) by 1046 days.

(21) Appl. No.: 17/642,304

(22) PCT Filed: Sep. 10, 2020

(86) PCT No.: PCT/EP2020/075303
§ 371 (c)(1),
(2) Date: Mar. 11, 2022

(87) PCT Pub. No.: WO2021/048265
PCT Pub. Date: Mar. 18, 2021

(65) Prior Publication Data
US 2023/0035663 A1      Feb. 2, 2023

(30) Foreign Application Priority Data
Sep. 13, 2019    (GB) ...................................... 1913252

(51) Int. Cl.
C04B 35/5831        (2006.01)
C04B 35/626         (2006.01)
C04B 35/645         (2006.01)

(52) U.S. Cl.
CPC ...... *C04B 35/5831* (2013.01); *C04B 35/6261* (2013.01); *C04B 35/645* (2013.01);
(Continued)

(58) Field of Classification Search
None
See application file for complete search history.

(56) References Cited

U.S. PATENT DOCUMENTS 4,334,928 A * 6/1982 Hara ................... C04B 35/5831
428/565
2012/0208006 A1 * 8/2012 Okamura .......... C04B 35/62897
428/328
(Continued)

FOREIGN PATENT DOCUMENTS

CN         107377981 A      11/2017
EP         2612719 A1       7/2013
(Continued)

OTHER PUBLICATIONS

Zhong et al., "Synthesis of spherical (30nm) and rod-like (200nm) zirconia co-reinforced mullite nanocomposites," Ceramics International 39 (2013), pp. 4163-4170 (Year: 2013).*
(Continued)

*Primary Examiner* — Amber R Orlando
*Assistant Examiner* — Paul Alan Forsyth
(74) *Attorney, Agent, or Firm* — Armstrong Teasdale LLP

(57)                    ABSTRACT

This disclosure relates to polycrystalline cubic boron nitride material with cBN particles in a metal matrix comprising zirconium nitride and/or vanadium nitride precipitates or grains.

16 Claims, 21 Drawing Sheets

(52) U.S. Cl.

CPC ................. *C04B 2235/3813* (2013.01); *C04B 2235/3843* (2013.01); *C04B 2235/3856* (2013.01); *C04B 2235/386* (2013.01); *C04B 2235/3865* (2013.01); *C04B 2235/3886* (2013.01); *C04B 2235/78* (2013.01)

(56) References Cited

U.S. PATENT DOCUMENTS

| | | | | |
|---|---|---|---|---|
| 2012/0329632 A1 * | 12/2012 | Malik | ................ | C04B 35/5611 |
| | | | | 501/87 |
| 2017/0197886 A1 * | 7/2017 | Danda | .................. | C04B 35/645 |
| 2017/0362130 A1 | 12/2017 | Hirano et al. | | |
| 2018/0230058 A1 * | 8/2018 | Perie | .................. | C04B 35/4885 |

FOREIGN PATENT DOCUMENTS

| | | | | | |
|---|---|---|---|---|---|
| EP | 3156384 | A1 | 4/2017 | | |
| JP | 10551267 | A | 3/1993 | | |
| WO | WO-2018167022 | A1 * | 9/2018 | ............. | C04B 35/64 |

OTHER PUBLICATIONS

Combined Search and Examination Report issued for GB1913252. 1, dated Mar. 19, 2020 (7 pages).

Combined Search and Examination Report issued for GB2014222. 0, dated Nov. 16, 2020 (7 pages).

International Search Report and Written Opinion issued for PCT/ EP2020/075303, dated Nov. 19, 2020 (12 pages).

\* cited by examiner

*Evolution of tool wear with cutting time (criterion of VB=0.3mm)*

*Evolution of tool wear with cutting time (criterion of VB=0.3mm)*

$a_1$) V2 Edge 1, 9 passes $a_2$) V2 Edge 2, 9 passes $b_1$) Z11 Edge 1, 9 passes $b_2$) Z11 Edge 2, 15 passes $c_1$) DSC500 Edge 1, 9 passes $c_2$) DSC500 Edge 2, 9 passes

SINTERED POLYCRYSTALLINE CUBIC BORON NITRIDE MATERIAL

CROSS-REFERENCE TO RELATED APPLICATIONS

This application is the § 371 national stage of International Application No. PCT/EP2020/075303, filed Sep. 10, 2020, which claims priority to Great Britain Application No. 1913252.1, filed Sep. 13, 2019.

FIELD OF THE INVENTION

The invention relates to the field of sintered polycrystalline cubic boron nitride materials, and to methods of making such materials.

BACKGROUND ART

Polycrystalline super-hard materials, such as polycrystalline diamond (PCD) and polycrystalline cubic boron nitride (PCBN) may be used in a wide variety of tools for cutting, machining, drilling or degrading hard or abrasive materials such as rock, metal, ceramics, composites and wood-containing materials.

Abrasive compacts are used extensively in cutting, turning, milling, grinding, drilling and other abrasive operations. They generally contain ultrahard abrasive particles dispersed in a second phase matrix. The matrix may be metallic or ceramic or a cermet. The ultrahard abrasive particles may be diamond, cubic boron nitride (cBN), silicon carbide or silicon nitride and the like. These particles may be bonded to each other during the high pressure and high temperature compact manufacturing process generally used, forming a polycrystalline mass, or may be bonded via the matrix of second phase material(s) to form a sintered polycrystalline body. Such bodies are generally known as polycrystalline diamond or polycrystalline cubic boron nitride, where they contain diamond or cBN as the ultra-hard abrasive, respectively.

U.S. Pat. No. 4,334,928 teaches a sintered compact for use in a tool consisting essentially of 20 to 80 volume % of cubic boron nitride; and the balance being a matrix of at least one matrix compound material selected from the group consisting of a carbide, a nitride, a carbonitride, a boride and a silicide of a IVa or a Va transition metal of the periodic table, mixtures thereof and their solid solution compounds. The matrix forms a continuous bonding structure in a sintered body with the high pressure boron nitride interspersed within a continuous matrix. The methods outlined in this patent all involve combining the desired materials using mechanical milling/mixing techniques such as ball milling, mortars and the like.

Sintered polycrystalline bodies may be 'backed' by forming them on a substrate. Cemented tungsten carbide, which may be used to form a suitable substrate, is formed from carbide particles dispersed, for example, in a cobalt matrix by mixing tungsten carbide particles/grains and cobalt together then heating to solidify. To form the cutting element with an ultra-hard material layer such as PCD or PCBN, diamond particles or grains or CBN grains are placed adjacent the cemented tungsten carbide body in a refractory metal enclosure such as a niobium enclosure and are subjected to high pressure and high temperature so that intergrain bonding between the diamond grains or CBN grains occurs, forming a polycrystalline super hard diamond or polycrystalline CBN layer.

In some instances, the substrate may be fully cured prior to attachment to the ultra-hard material layer whereas in other cases, the substrate may be green (not fully cured). In the latter case, the substrate may fully cure during the HTHP sintering process. The substrate may be in powder form and may solidify during the sintering process used to sinter the ultra-hard material layer.

FIG. 1 shows an exemplary method for producing a sintered PCBN material. The following numbering corresponds to that of FIG. 1:

S1. Matrix precursor powders are pre-mixed. Examples of matrix precursor powders include carbides and/or nitrides of titanium and aluminium. Typical average particle sizes for the matrix precursor powders are between 1 μm and 10 μm.

S2. The matrix precursor powders are heat treated at over 1000° C. for at least an hour to initiate a pre-reaction between the matrix precursor particles and to form a "cake".

S3. The cake is crushed and sieved to obtain the desired size fraction of particles.

S4. Cubic boron nitride (cBN) particles with an average particle size of 0.5 μm to 15 μm are added to the sieved matrix precursor powders.

S5. The resultant mixed powders are ball milled to break down the matrix precursor powders to a desired size (typically 50 nm to 700 nm) and to intimately mix the matrix precursor powders with the cBN particles. This process may take many hours, and involves using milling media such as tungsten carbide balls.

S6. The resultant milled powder is dried under vacuum or low pressure at above 60° C. to remove solvent, and subsequently conditioned by slowly allowing oxygen into the system to passivate metallic surfaces such as aluminium.

S7. The dried powder is sieved and a pre-composite assembly is prepared.

S8. The pre-composite assembly is heat treated at above 700° C. to remove any adsorbed water or gases.

S9. The outgassed pre-composite assembly is assembled into a capsule suitable for sintering.

S10. The capsule is sintered in a high pressure high temperature (HPHT) process of at least 1250° C. and at least 4 GPa to form a sintered PCBN material.

Both tungsten (W) and cobalt (Co) have been classed in Europe as a Critical Raw Material (CRM). CRMs are raw materials deemed economically and strategically important for the European economy. In principal, they have a high-risk associated with their supply, have a significant importance for key sectors in the European economy such as consumer electronics, environmental technologies, automotive, aerospace, defence, health and steel, and they have a lack of (viable) substitutes. Both tungsten and cobalt are main constituents for two important classes of hard materials, cemented carbides/WC—Co, and PCD/diamond-Co.

SUMMARY OF THE INVENTION

It is an aim of this invention to develop viable alternative materials for tooling operations that perform well under extreme conditions.

In one aspect of the invention, there is provided a polycrystalline cubic boron nitride, PCBN, material comprising: between 30 and 90 vol. % cubic boron nitride, cBN, particles; a matrix material in which the cBN particles are dispersed, the content of the matrix material being between 10 vol. % and 70 vol. % of the PCBN material; the matrix material comprising any of a titanium compound and an aluminium compound, or a mixture thereof; the matrix material further comprising precipitates and/or grains containing zirconium and/or vanadium, and optionally, tungsten and/or titanium, said precipitates and/or grains having a shape that is any of substantially spherical, platelet-like or needle-like; said precipitates and/or grains having a mean largest linear dimension of no more than 1 μm.

The precipitates and/or grains may comprise nitrides, carbides, carbonitrides and/or diborides.

Optionally, zirconium-containing precipitates and/or grains and/or vanadium-containing precipitates and/or grains comprise 10 vol. %-25 vol. % of the PCBN material.

Optionally, zirconium-containing precipitates and/or grains and/or vanadium-containing precipitates and/or grains comprise 10 vol. %, or 17.5 vol. %, or 25 vol. % of the PCBN material.

Zirconium-containing precipitates and/or grains and/or vanadium-containing precipitates and/or grains may have a mean largest linear dimension of no more than 0.50 μm.

Alternatively, zirconium-containing precipitates and/or grains and/or vanadium-containing precipitates and/or grains may have a mean largest linear dimension of no more than 0.20 μm.

The matrix material may comprise any of titanium carbonitride, titanium carbide, titanium nitride, titanium diboride, aluminium nitride and aluminium oxide.

The PCBN material may comprise 10 vol. %-25 vol. % titanium carbide, TiC or titanium nitride, TiN.

The PCBN material may also further comprise 5 vol. % aluminium, Al, or a compound thereof. Preferably, the PCBN material comprises 60 vol. % cubic boron nitride, cBN.

As an option, the cBN particles have an average size between 0.5 μm and 15 μm. Preferably, the PCBN material has a Vickers microhardness of between 26 GPa and 34 GPa.

According to a second aspect of the invention, there is provided a method of making a polycrystalline cubic boron nitride, PCBN, material, the method comprising:

milling together precursor powders of:
cubic boron nitride, cBN,
a vanadium containing powder and/or a zirconium containing powder, and
powders containing any of aluminium and titanium;
pressing the milled precursor powder to form a green body;
sintering the green body at a temperature between 1800° C. and 2300° C. at a pressure of between 7.0 GPa and 8.5 GPa to form sintered PCBN material;
the sintered PCBN material comprising particles of cubic boron nitride, cBN, dispersed in a matrix material comprising or consisting of zirconium-containing precipitates and/or vanadium-containing precipitates, and optionally tungsten-containing precipitates and/or titanium containing precipitates, said precipitates having a mean largest linear dimension of no more than 1 μm.

As an option, the temperature is between 1800° C. and 1900° C.

Optionally, the step of milling together the precursor powders comprises two sub-steps:

milling the vanadium-containing powder and/or the zirconium-containing powder for a period of time;
adding the powders of cubic boron nitride and powders containing aluminium and/or titanium;
milling together all the precursor powders for a further period of time.

The method may further comprise divide the green body into portions prior to the step of sintering.

According to a third aspect of the invention, a tool comprises the PCBN material in accordance with the first aspect of the invention.

Preferably, the tool is a tool for cutting, turning, milling, grinding, drilling, or other abrasive applications.

BRIEF DESCRIPTION OF THE DRAWINGS

Non-limiting embodiments will now be described by way of example and with reference to the accompanying drawings in which.

In the above-mentioned Figures, the composition of the materials shown in the SEM micrographs was confirmed using Transmission Electron Microscopy (TEM) analysis.

DETAILED DESCRIPTION

Figure 1:
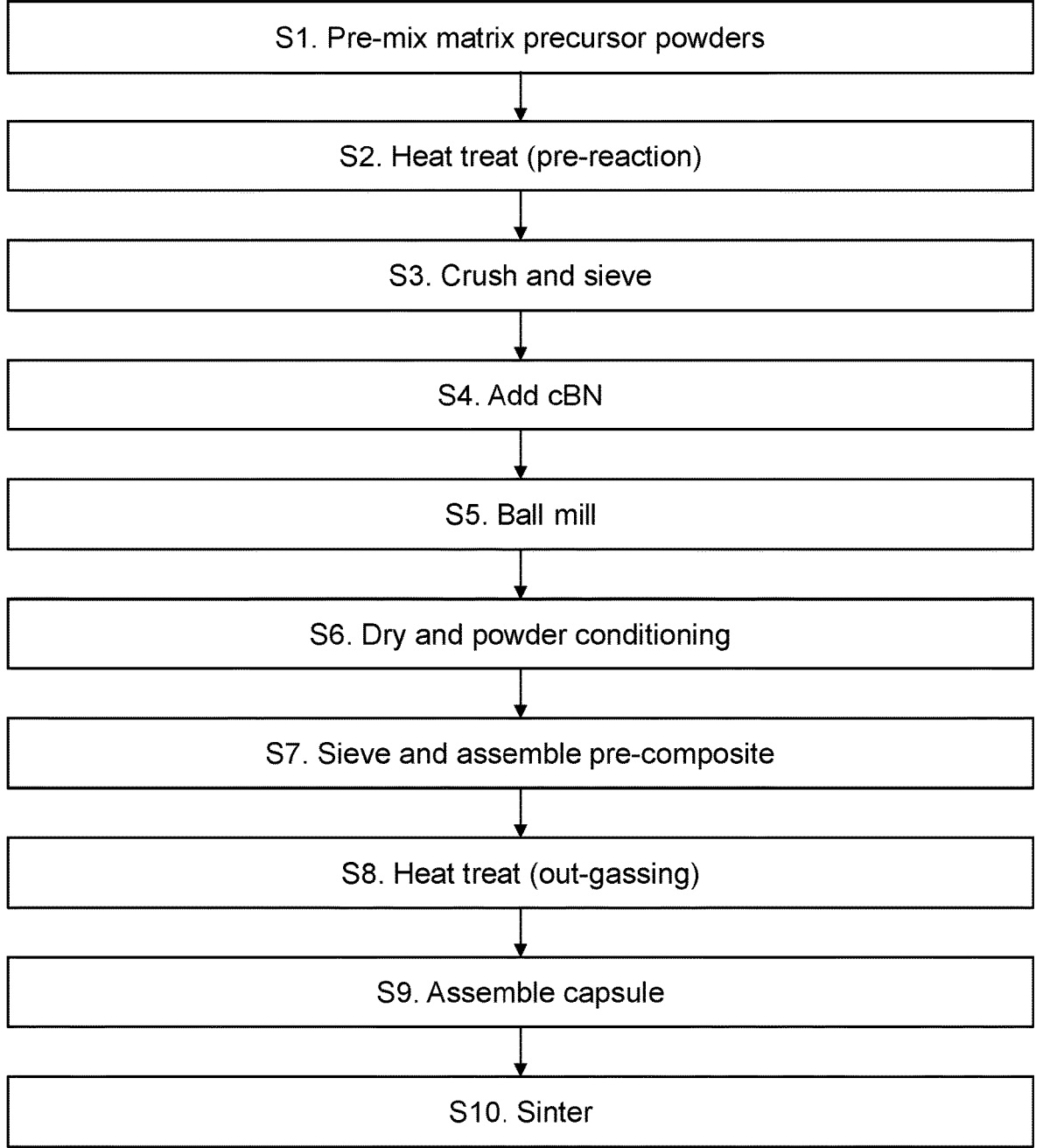
FIG. 1 is a flow diagram showing a known exemplary method of making a sintered PCBN material.
Figure 2:
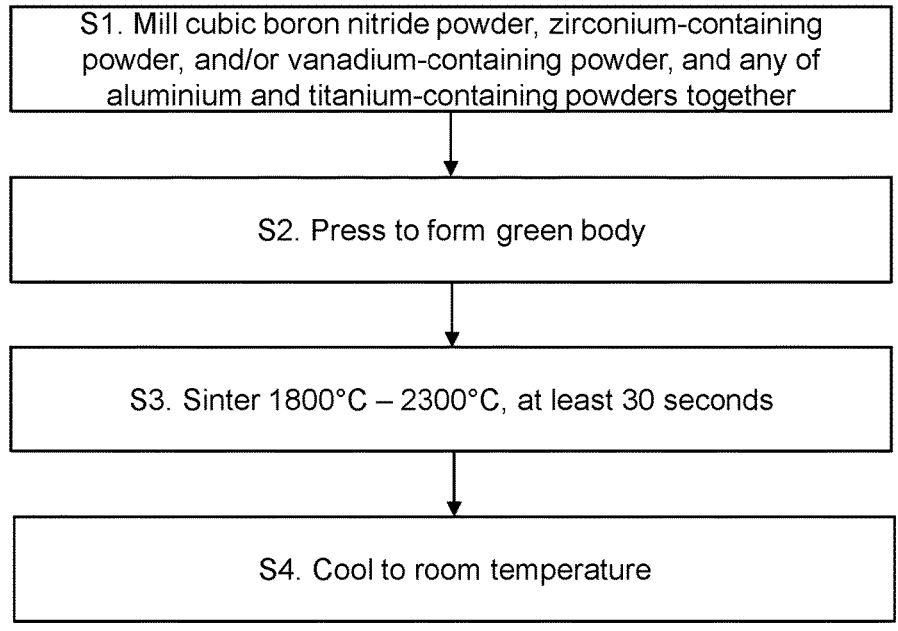
FIG. 2 is a flow diagram showing exemplary steps to make a PcBN material in accordance with the invention.
Figure 3:
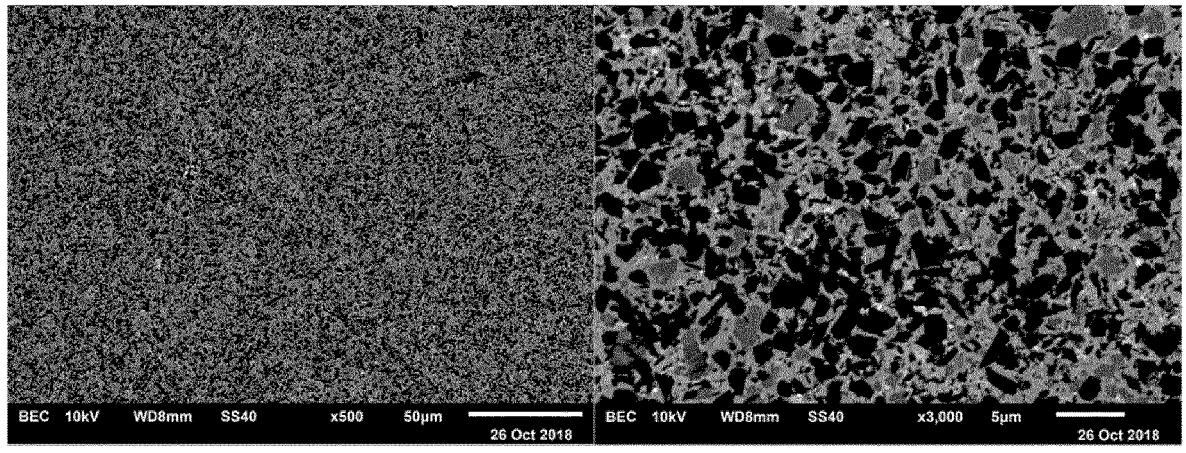
FIG. 3 indicates Scanning Electron Microscopy (SEM) micrographs of PcBN TiC reference material sintered at 1800° C., at different magnifications.
Figure 4:
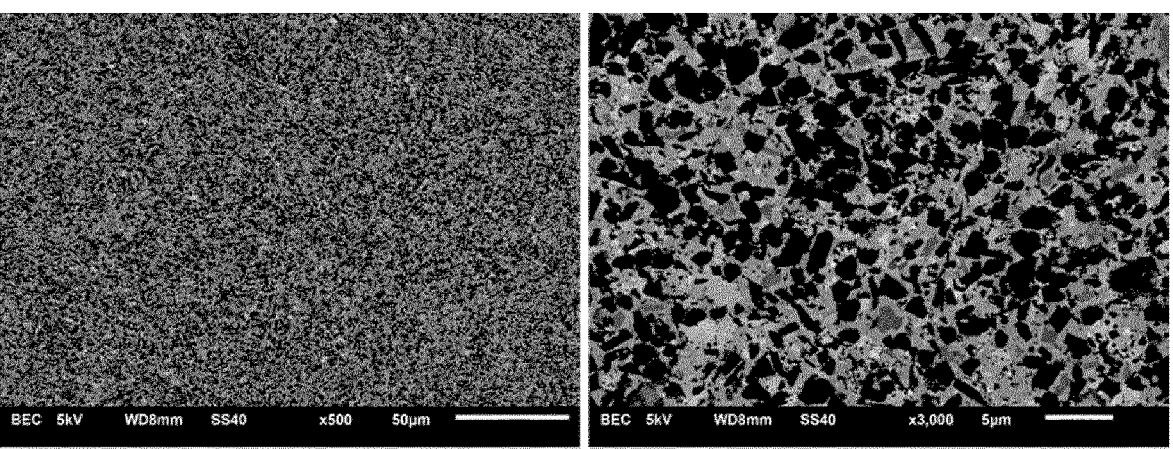
FIG. 4 indicates SEM micrographs of the PcBN ZrN 10 vol. % system sintered at 1800° C., at different magnifications.
Figure 5:
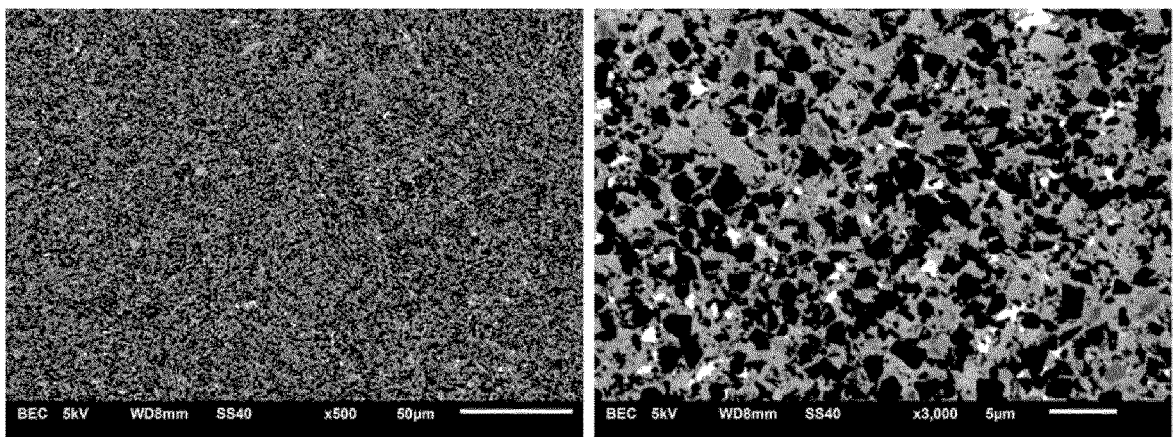
FIG. 5 indicates SEM micrograph of PcBN ZrN 17.5 vol. % sintered at 1800° C., at different magnifications.
Figure 6:
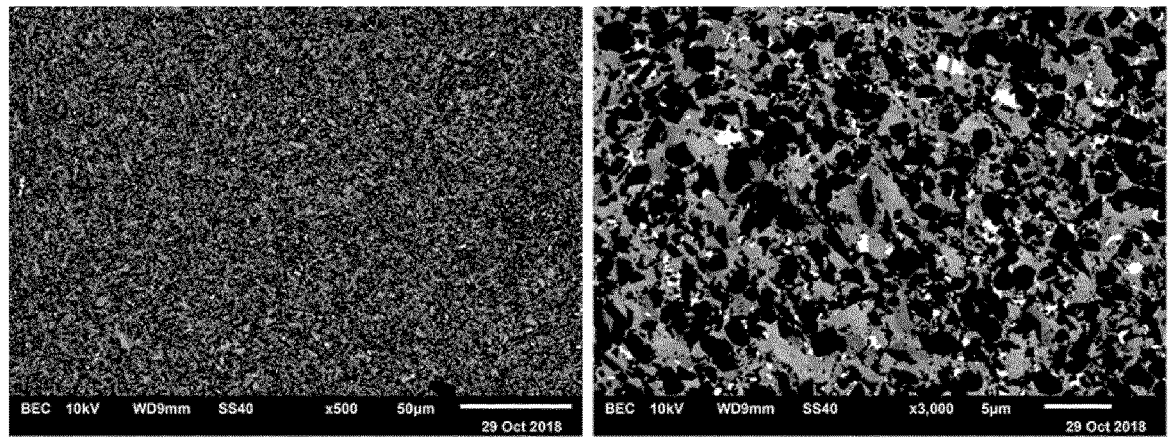
FIG. 6 indicates SEM micrographs of the PcBN ZrN 25 vol. % sintered at 1800° C., at different magnifications.
Figure 7:
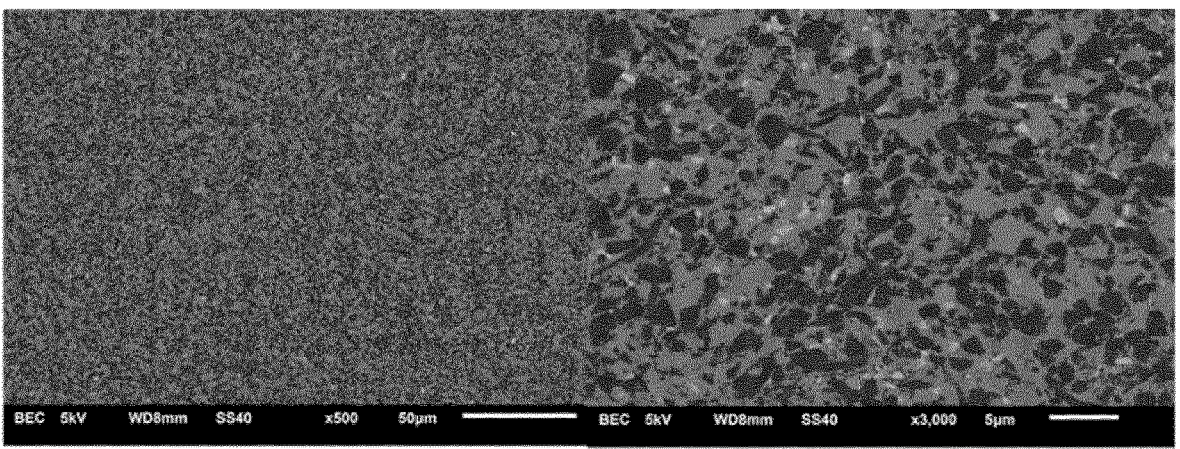
FIG. 7 indicates SEM micrographs of the PcBN VN 25 vol. % sintered at 1800° C., at different magnifications.
Figure 8A:
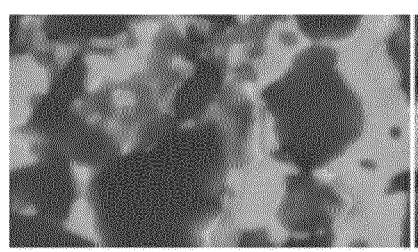
FIG. 8 show examples of microstructural features a) A1, b) A2, c) N1, d) N2, and e) N3
Figure 8B:
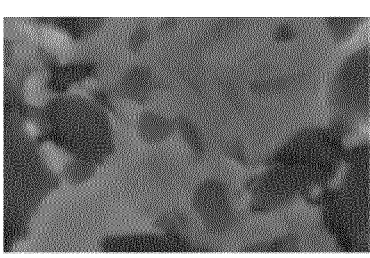
Figure 8C:
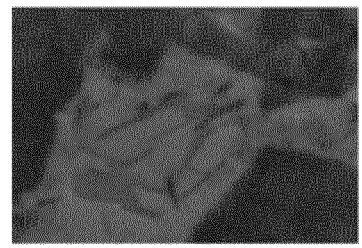
Figure 8D:
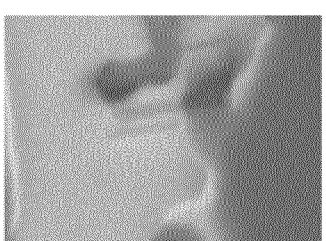
Figure 8E:
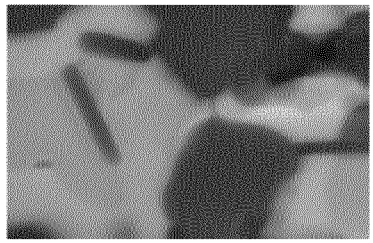
Figure 9:
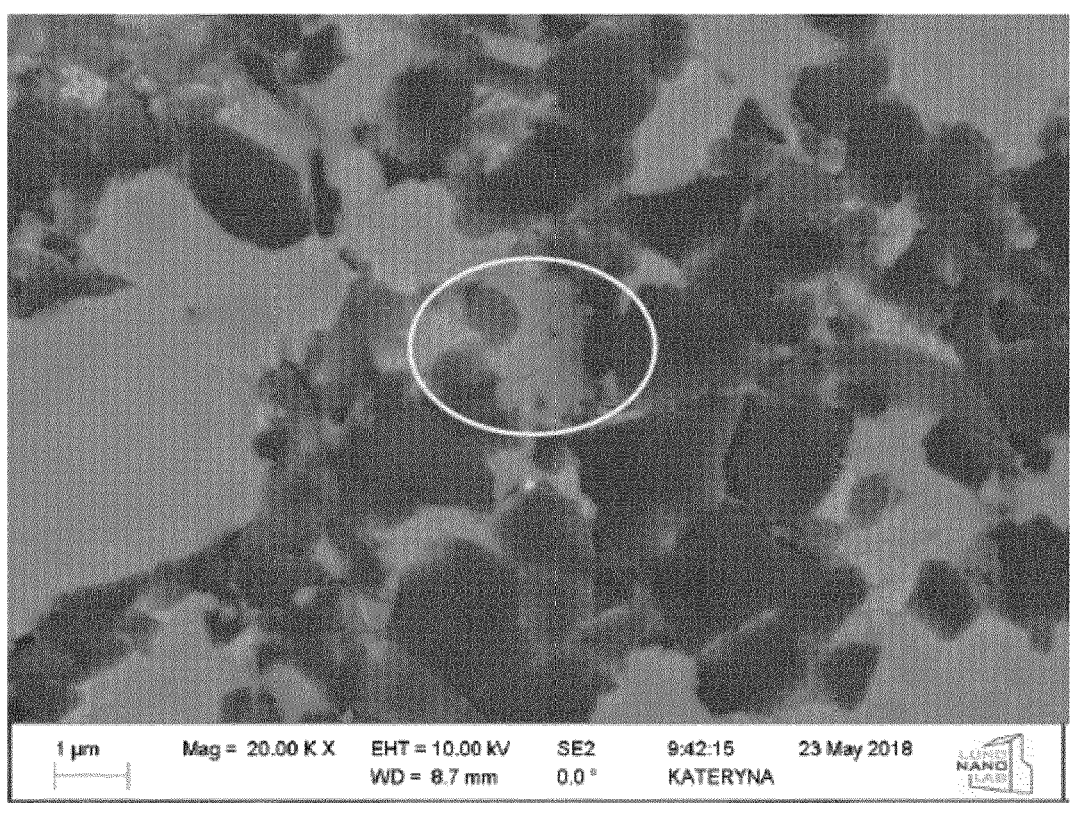
FIG. 9 indicates an SEM micrograph of cBN-TiC—VN—Al (60-25-10-5 vol. %) at temperature 1750° C.
Figure 10:
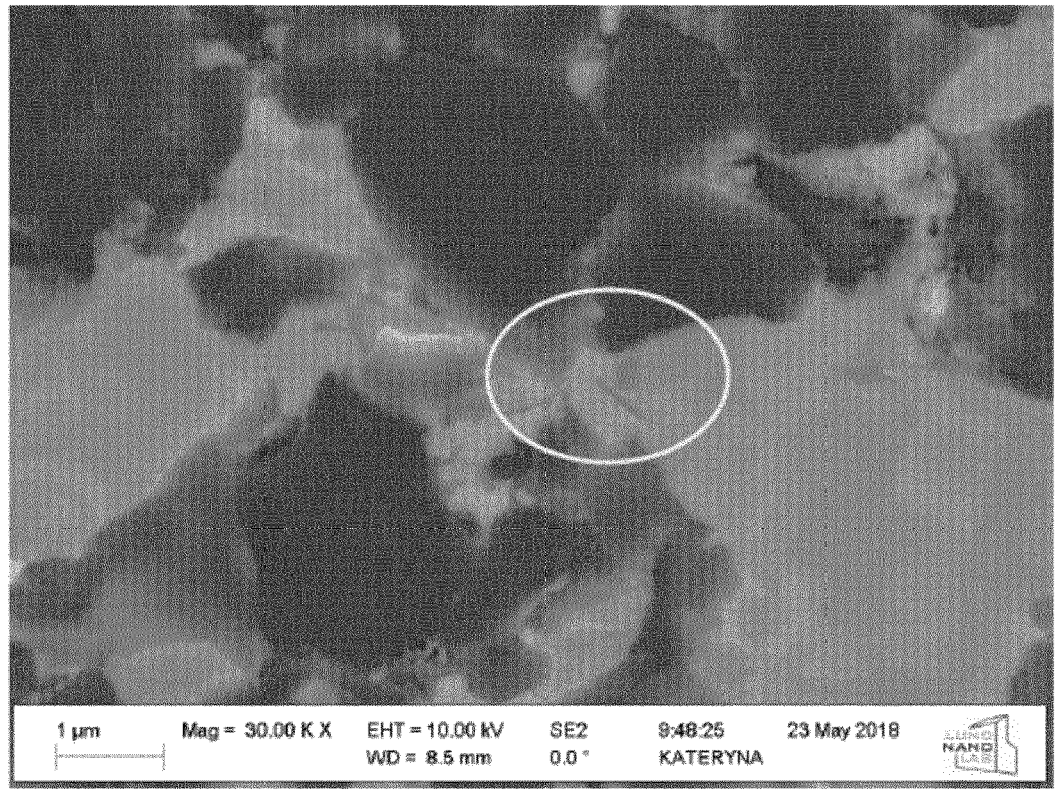
FIG. 10 indicates an SEM micrograph of cBN-TiC—VN—Al (60-25-10-5 vol. %) at temperature 1850° C.
Figure 11:
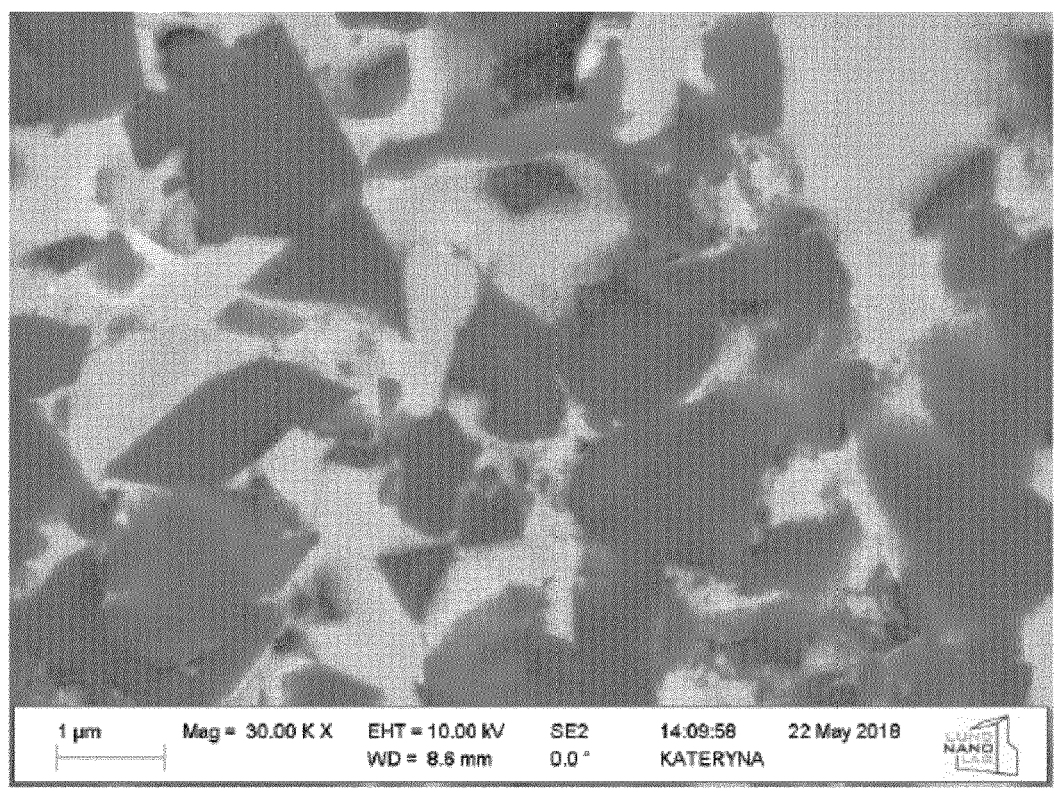
FIG. 11 indicates an SEM micrograph of cBN-TiC—VN—Al (60-17.5-17.5-5 vol. %) at temperature 1750° C.
Figure 12:
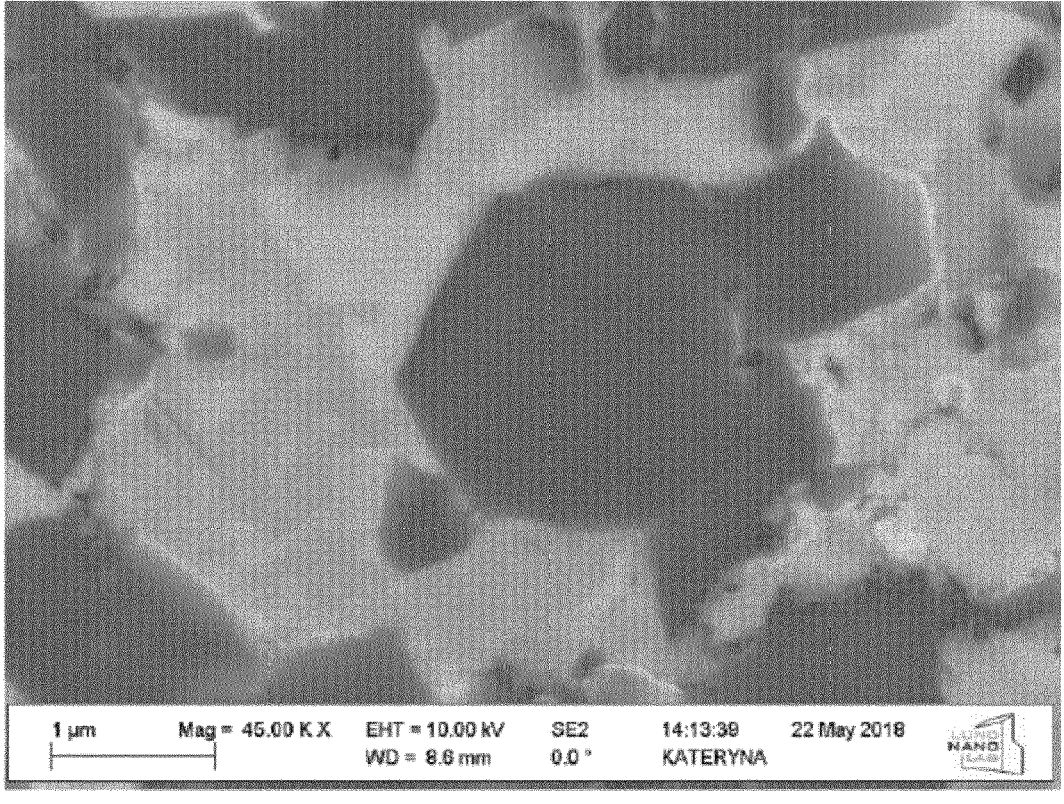
FIG. 12 indicates a high magnification SEM micrograph of cBN-TiC—VN—Al (60-17.5-17.5-5 vol. %) at temperature 1850° C.
Figure 13:
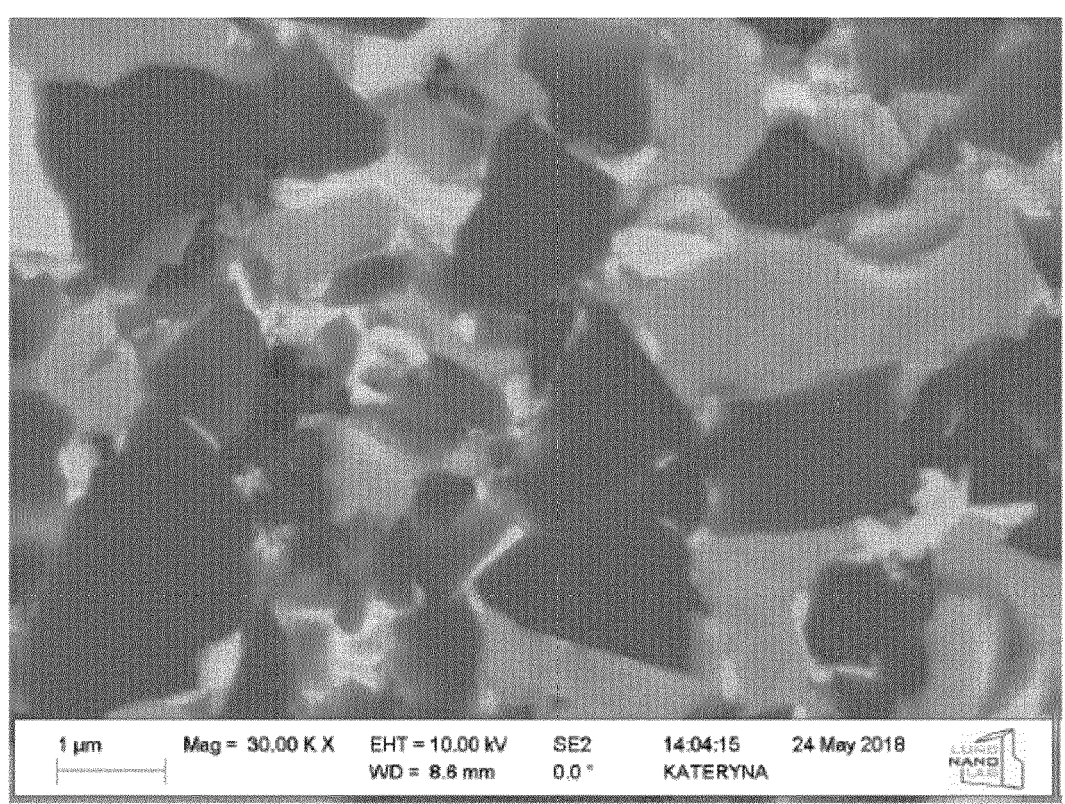
FIG. 13 indicates an SEM micrograph of cBN-TiC—ZrN—Al (60-25-10-5 vol. %) at temperature 1750° C.
Figure 14:
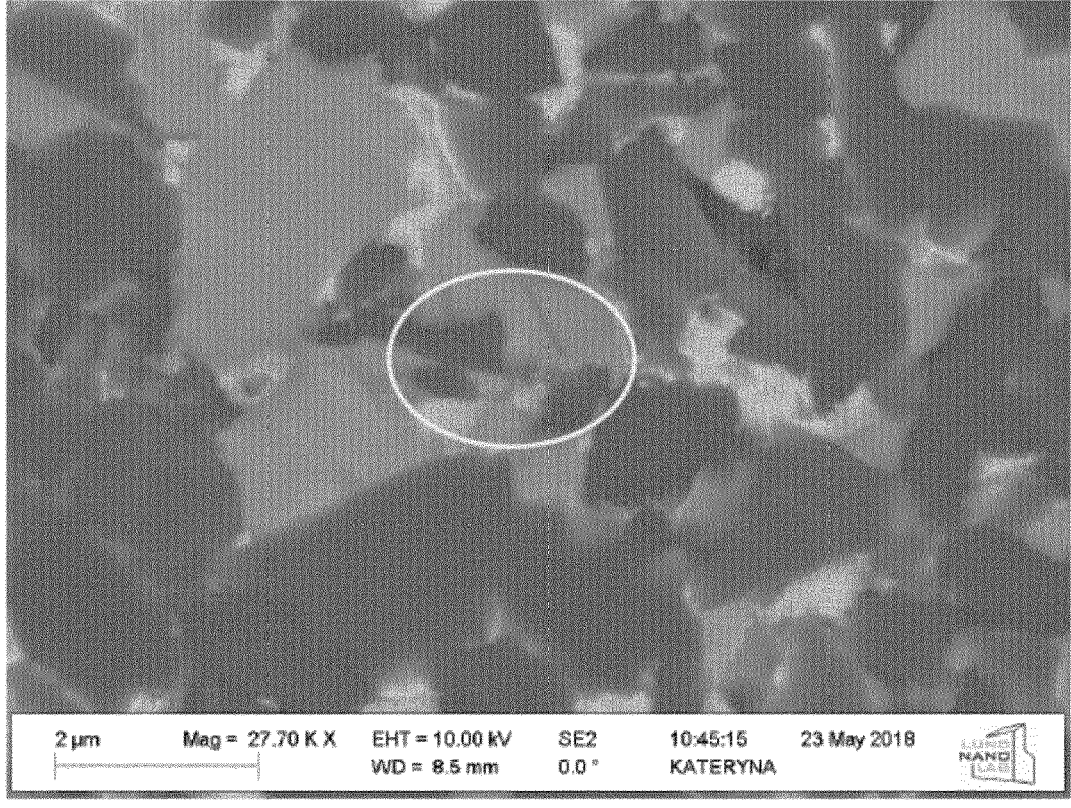
FIG. 14 indicates a high magnification SEM micrograph of cBN-TiC—ZrN—Al (60-25-10-5 vol. %) at temperature 1850° C.
Figure 15:
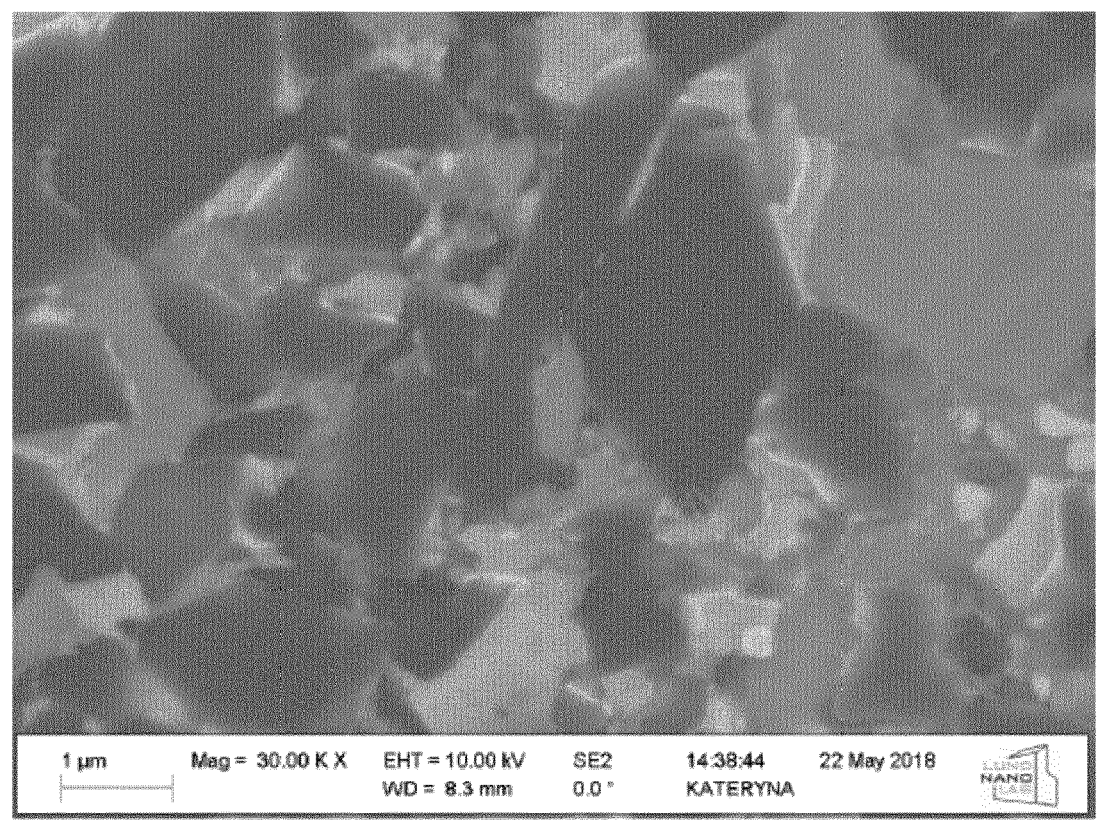
FIG. 15 indicates an SEM micrograph of cBN-TiC—ZrN—Al (60-17.5-17.5-5 vol. %) at temperature 1750° C.
Figure 16:
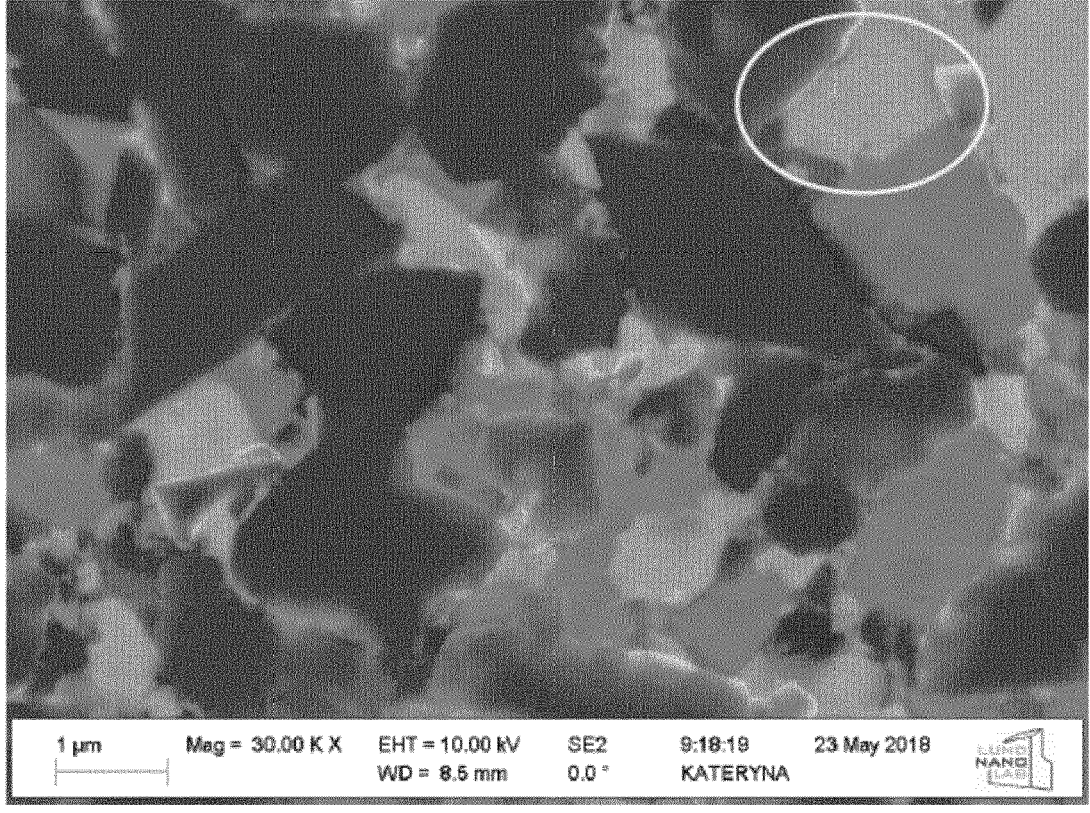
FIG. 16 indicates an SEM micrograph of cBN-TiC—ZrN—Al (60-17.5-17.5-5 vol. %) at temperature 1850° C.
Figure 17:
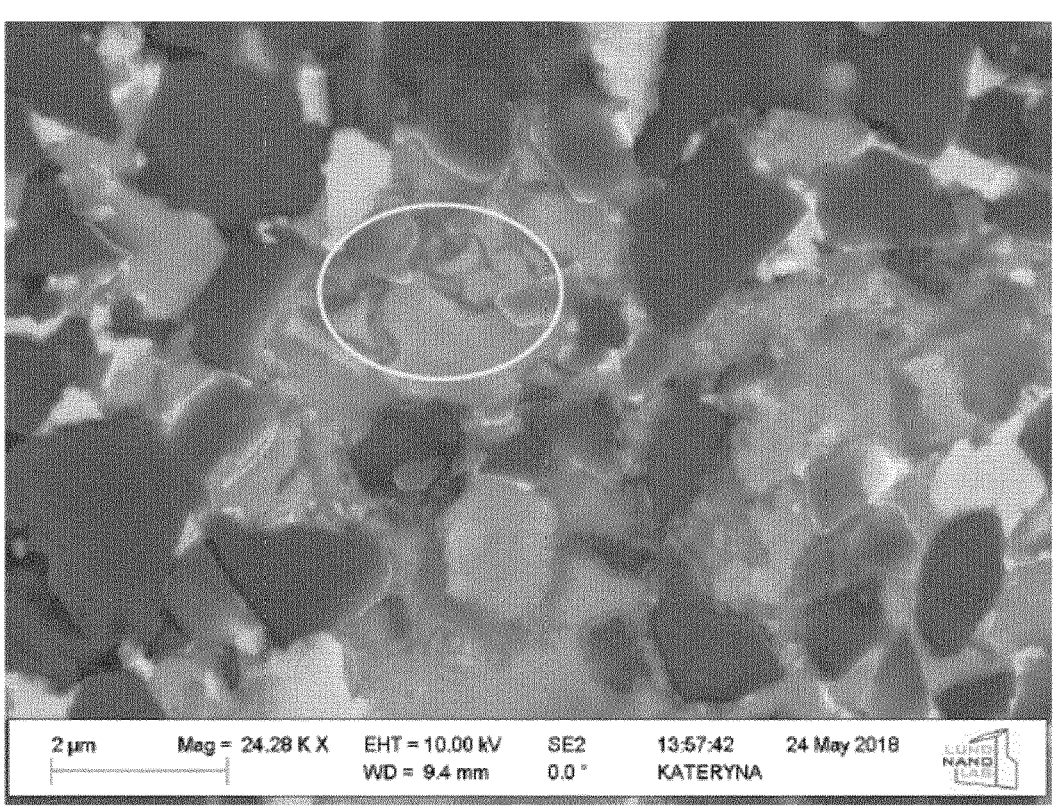
FIG. 17 indicates a high magnification SEM micrograph of cBN-TiN—ZrN—Al (60-25-10-5 vol. %) at temperature 1750° C.
Figure 18:
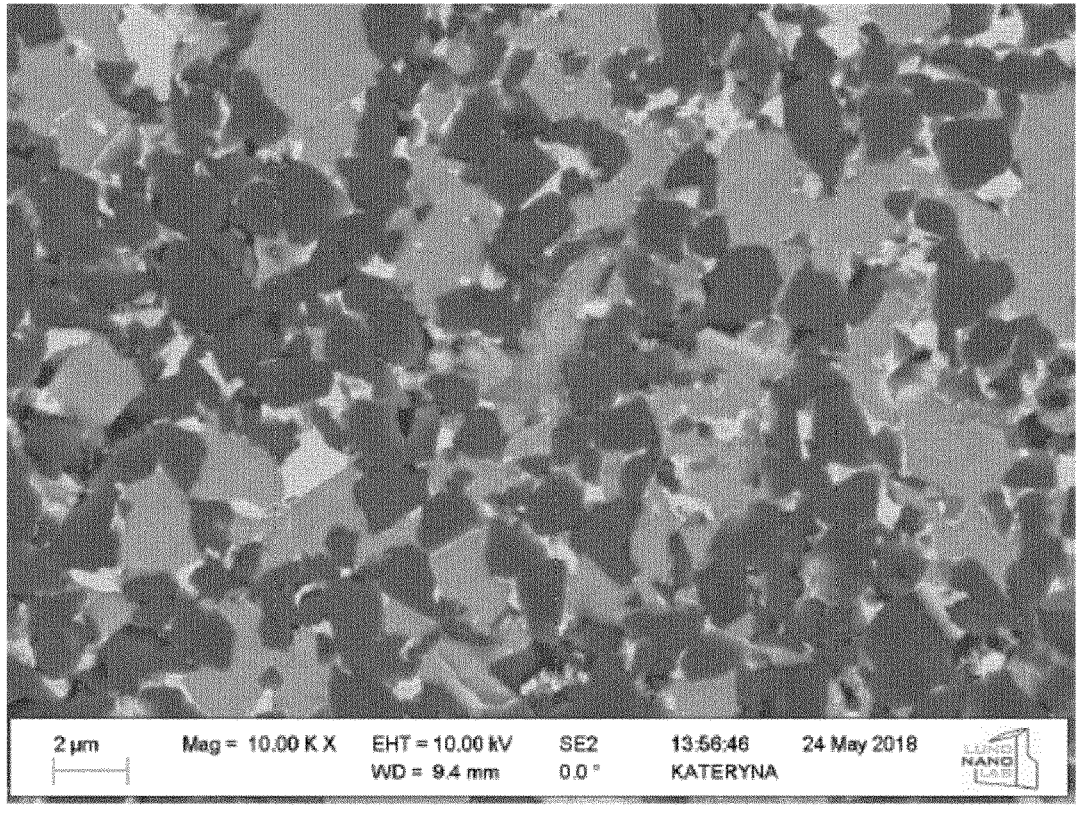
FIG. 18 indicates a low magnification SEM micrograph of cBN-TiN—ZrN—Al (60-25-10-5 vol. %) at temperature 1750° C.
Figure 19:
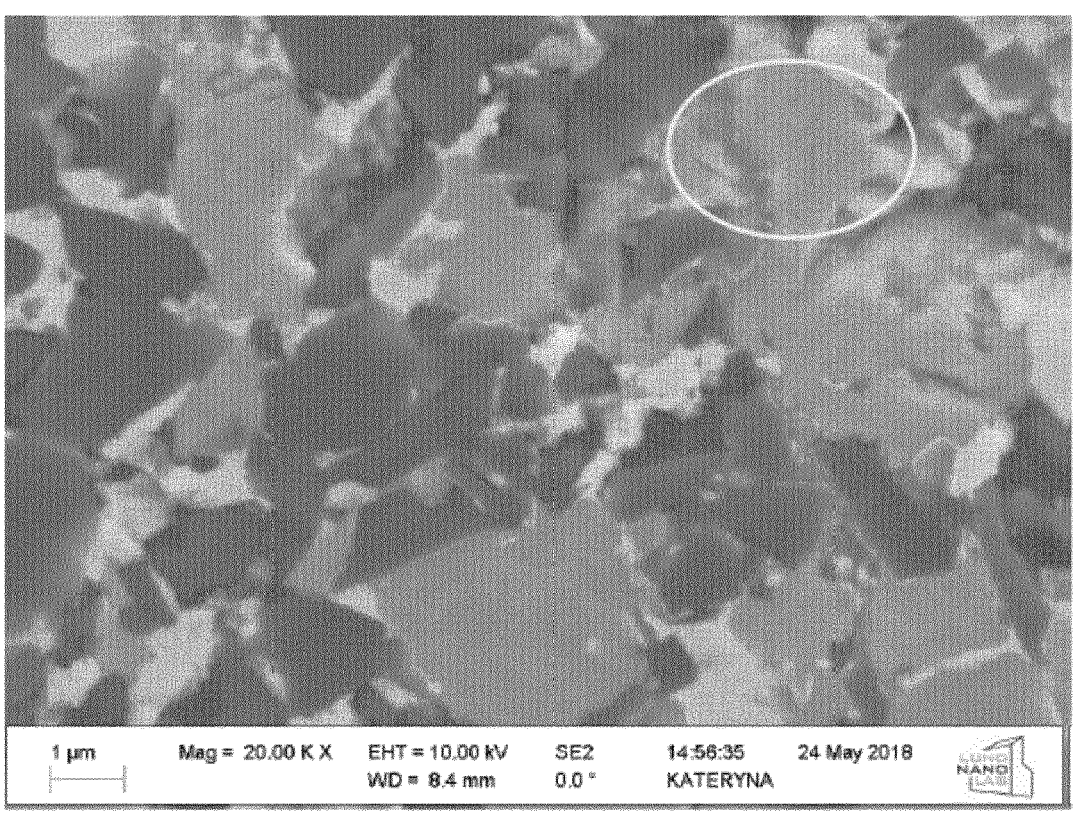
FIG. 19 indicates a low magnification SEM micrograph of cBN-TiN—ZrN—Al (60-17.5-17.5-5 vol. %) at temperature 1750° C.
Figure 20:
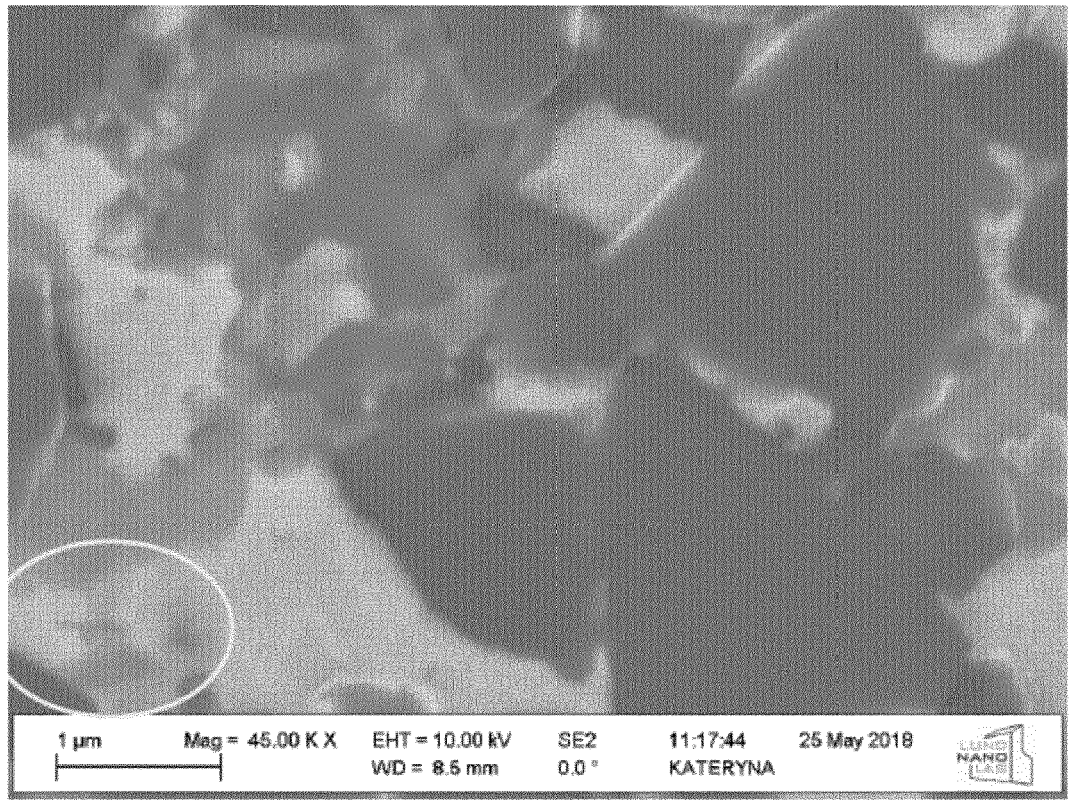
FIG. 20 indicates a high magnification SEM micrograph of cBN-TiN—ZrN—Al (60-17.5-17.5-5 vol. %) at temperature 1850° C.
Figure 21:
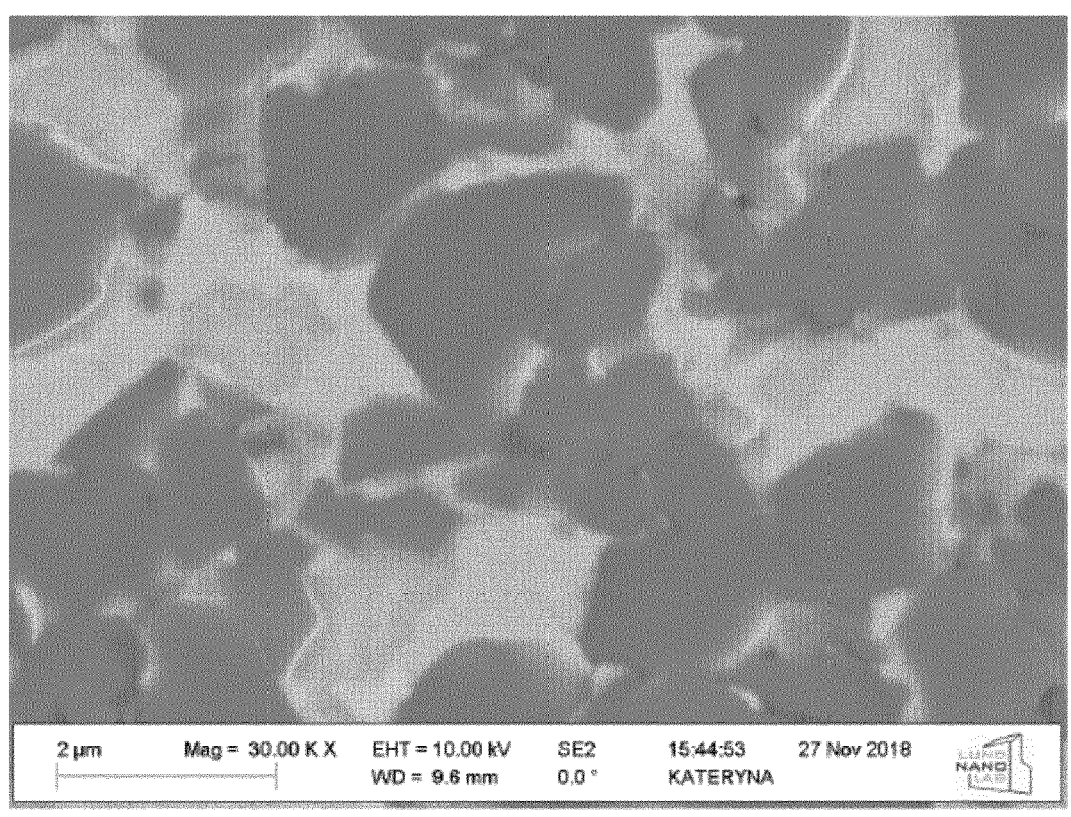
FIG. 21 indicates an SEM micrograph of cBN-TiN—VN—Al (60-17.5-17.5-5 vol. %) at temperature 1750° C.
Figure 22:
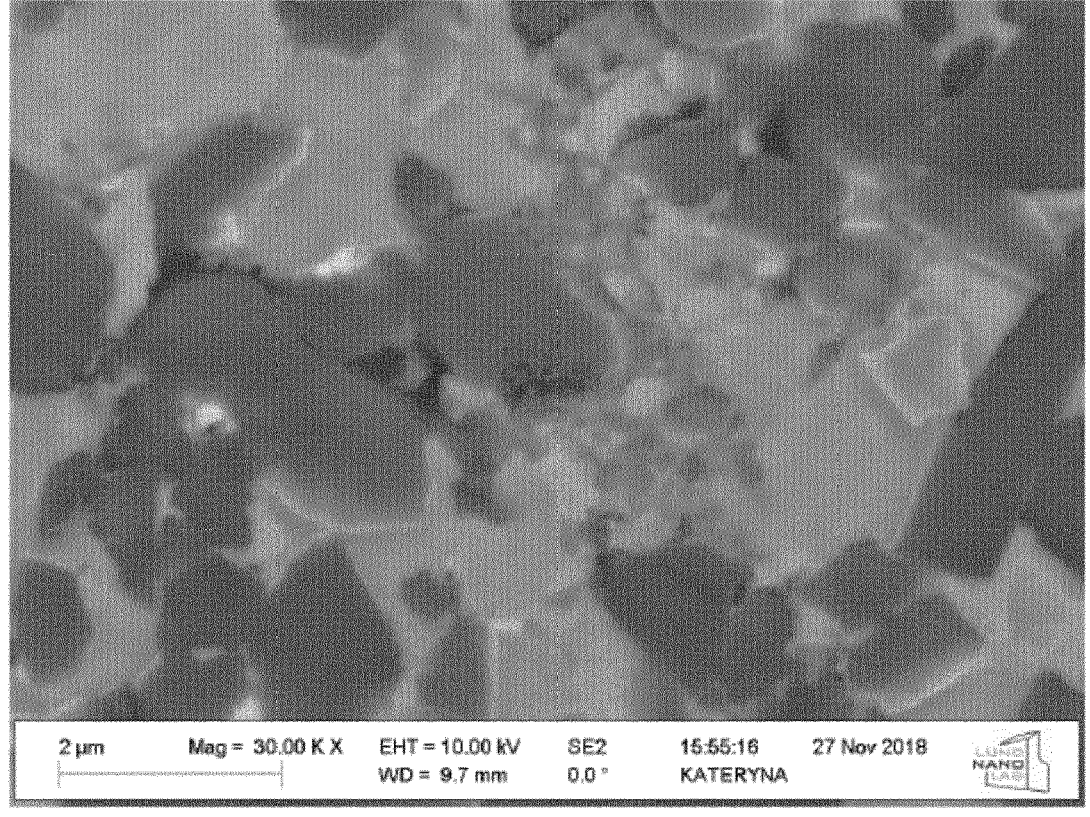
FIG. 22 indicates an SEM micrograph of cBN-TiN—VN—Al (60-17.5-17.5-5 vol. %) at temperature 1850° C.
Figure 23:
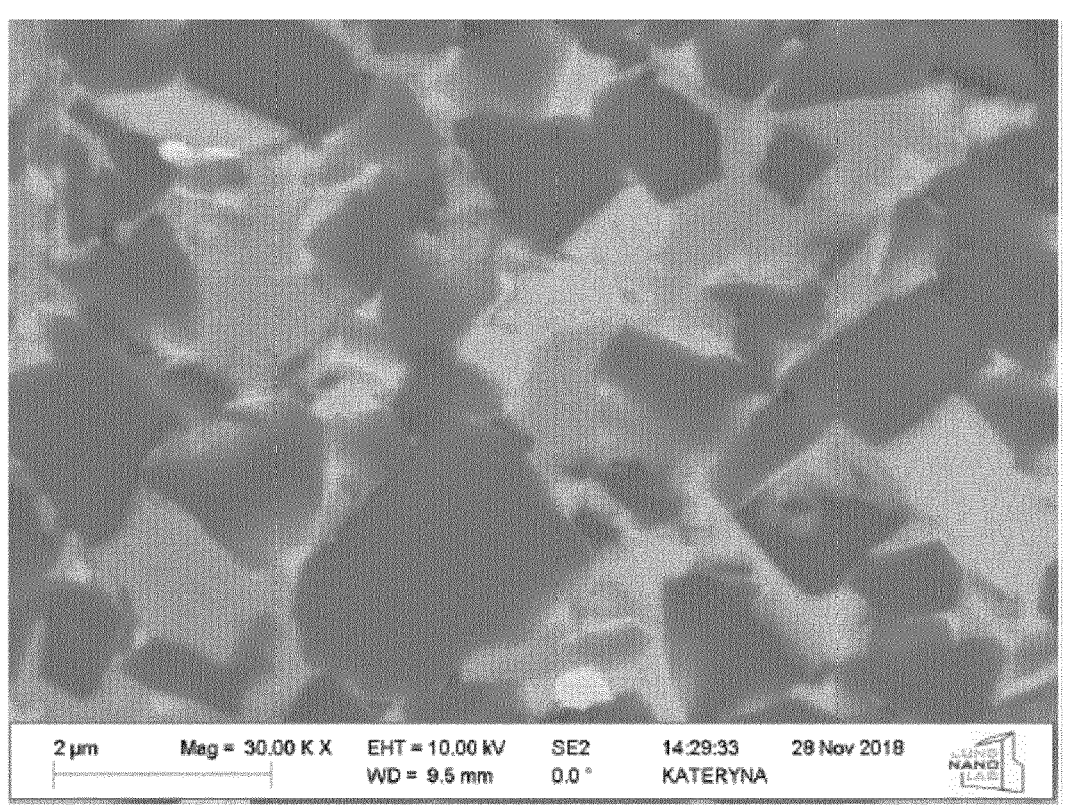
FIG. 23 indicates an SEM micrograph of cBN-ZrN—VN—Al (60-17.5-17.5-5 vol. %) at temperature 1750° C.
Figure 24:
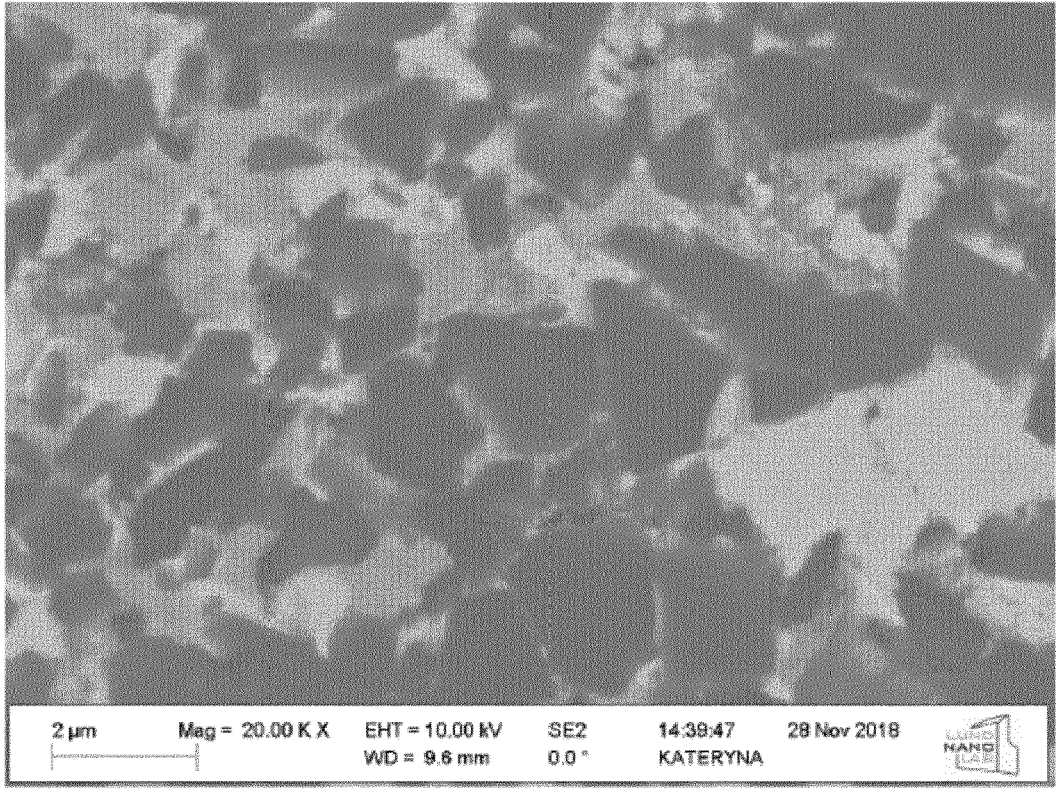
FIG. 24 indicates an SEM micrograph of cBN-ZrN—VN—Al (60-17.5-17.5-5 vol. %) at temperature 1850° C.

FIG. 2 is a flow diagram showing exemplary steps, in which the following numbering corresponds to that of FIG. 2.

S1. Precursor powders of zirconium-containing powder and/or vanadium-containing powder, and powders containing carbides and/or nitrides of titanium and aluminium are milled together to form an intimate mixture and obtain a desired particle size. The precursor powder mixing was carried out in organic solvent using ball-milling techniques and drying with a rotary evaporator.

S2. The milled powders are dry pressed together to form a green body that has adequate strength for handling during processing. Specifically, after drying, the powder was filled into a soft mould, which was compressed using Cold Isostatic Press to compact the powder and form the green body.

The compact is then cut into different heights to be fit into a high-pressure high-temperature (HPHT) capsule S3. The dry pressed green body is then high temperature vacuum heat treatment and sintered in a HPHT capsule at a temperature of at least 1800° C. (for example, 1800° C., 1900° C., 2000° C., and 2200° C.) at a pressure of about 8 GPa for a period of time of at least 30 seconds.

The sintering temperature was calibrated up to 1800° C. using S-type thermocouples.

S4. After sintering, the resultant sintered articles are cooled to room temperature. The cooling rate is uncontrolled. Cooling leads to the desired precipitation of VN-containing precipitates and/or ZrN-containing precipitates and optionally precipitates containing W and/or Ti.

Examples

Table 1 lists all the PcBN compositions that were included in this work, together with a TiC reference sample (i.e. without use of ZrN or VN in the binder).

TABLE 1

| Summary of PcBN compositions | | | | |
| --- | --- | --- | --- | --- |
| | cBN (vol %) | ZrN or VN (vol %) | TiC (vol %) | Al (vol %) |
| PcBN ZrN 10 | 60 | ZrN 10 | 25 | 5 |
| PcBN ZrN 17.5 | 60 | ZrN 17.5 | 17.5 | 5 |
| PcBN ZrN 25 | 60 | ZrN 25 | 10 | 5 |
| PcBN VN 25 | 60 | VN 25 | 10 | 5 |
| PcBN TiC ref | 60 | 0 | 35 | 5 |

Post-Sintering Visual Inspection

FIGS. 3, 4, 5, 6 and 7 show SEM micrographs of the different PcBN variants sintered at 1800° C. They are all homogeneous. In these images, the contrast in colour is due to difference in atomic weight. The cBN components are the lightest and show up as very dark/black in these images. Ceramic components (such as VN or ZrN) appear as grey phases and the heavier metallic components (such as WC contamination from ball milling) show up as bright/white particles in the SEM images. The results proved that the powder mixing methodology produced a homogeneous distribution of cBN and ceramic components.

Post-Sintering Hardness Check

The next step was to understand the effect of sintering conditions on the properties of the materials. These materials were tested by indentation with a 1 Kg Vicker's indentation method and the hardness results were calculated and summarized in Table 2. Indentations were made in the Wolpert 572 indenter and indentations were measured in the SEM to improve accuracy (as the indentations were of the order 20 microns in size).

TABLE 2

| Summary of the hardness of the different PcBN compositions | | | |
| --- | --- | --- | --- |
| | 1800° C. | 1900° C. | 2000° C. |
| PCBN ZRN 10 | 33.7 GPa | N/A | N/A |
| PCBN ZRN 17.5 | 28.2 GPa | 28.2 GPa | N/A |
| PCBN ZRN 25 | 28.5 GPa | N/A | N/A |
| PCBN VN 25 | 27.3 GPa | 26.1 GPa | 26.9 GPa |
| PCBN TIC REF | 26.8 GPa | 28.6 GPa | N/A |

All the sintered pieces had good hardness, with microhardness of the order 28 GPa considered to be good for this level of cBN content. Very low hardness values would have been considered to be an indication of poor sintering/bonding of the material phases. By the same token, a higher hardness value was taken as an indication of good sintering. Hardness was therefore used as a first indication of optimised sintering conditions.

Application Pre-Screening Testing

A selection of samples was then chosen for application pre-screening testing. These samples are listed in Table 3.

TABLE 3

| The PcBN variants prepared for testing | | |
| --- | --- | --- |
| | 1800° C. | 1900° C. |
| PcBN ZrN17.5 | Z2 (×2) | Z1 (×2) |
| PcBN ZrN10 | Z11 (×2) | |
| PcBN ZrN25 | Z8 (×2) | |
| PcBN VN25 | | V2 (×1) |
| PcBN TiC Reference | R1 (×2) | R2 (×2) |

Further information on the composition of the samples selected for application pre-screening testing is provided in Table 4 below.

TABLE 4

| A summary of all the ZrN and VN based PcBN variant compositions | | | | |
|---|---|---|---|---|
| cBN (vol %) | ZrN or VN (vol %) | TiC (vol %) | Al (vol %) | Sintering temperature |
| PcBN ZrN 17.5 | 60 | ZrN 17.5 | 17.5 | 5 | 1800° C., 1900° C. |
| PcBN ZrN 10 | 60 | ZrN 10 | 25 | 5 | 1800° C., 1900° C. |
| PcBN ZrN 25 | 60 | ZrN 25 | 10 | 5 | 1800° C., 1900° C. |
| PcBN VN 25 | 60 | VN 25 | 10 | 5 | 1900° C. |

The selected variants were tested in machining four materials of: (1) hardened (HRC 62.1) tool steel Caldie (by Uddeholm); (2) aged (HRC 44.7) superalloy Inconel 718™; (3) precipitation hardened (HRC 42.7) martensitic stainless steel 17-4 PH, (4) Ovako 677 (Ovatec 677).

(1) Testing by Machining Caldie Hardened Steel

A pre-screening test was carried out with the machining of Caldie hardened steel using the selected PcBN variants under the following cutting conditions: surface cutting speed $v_c$=120 m/min, feed rate f=0.1 mm/rev, depth of cut $a_p$=0.3 mm and DRY machining conditions.

Figure 25:
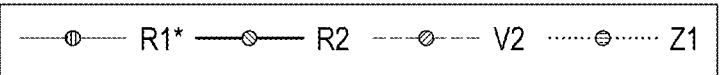
FIG. 25 is a graph indicating the evolution of tool wear with cutting time (criterion of VB=0.3 mm) for a first set of PcBN variants machining Caldie hardened steel.
Figure 25:
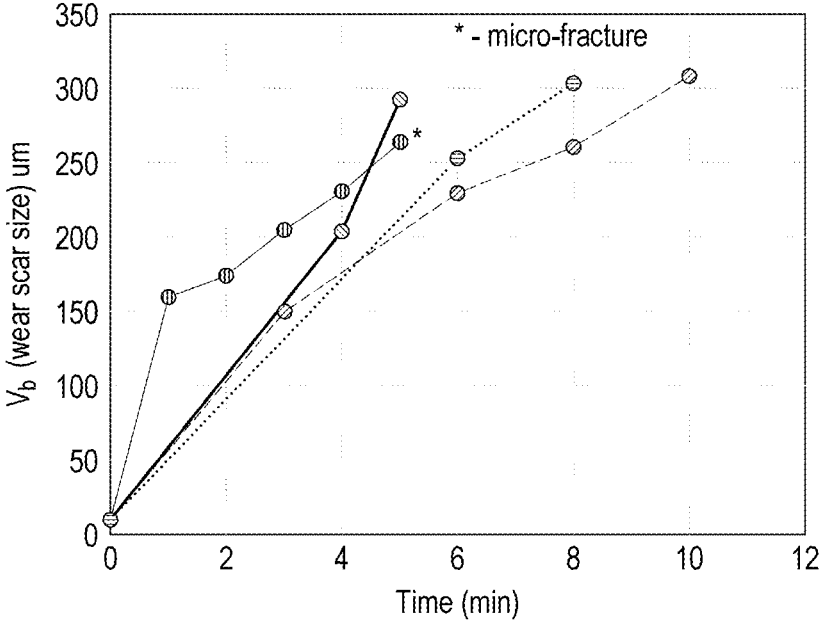
Figure 26:
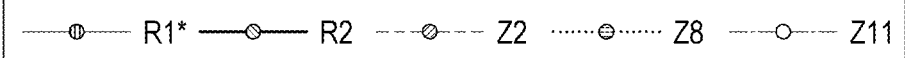
FIG. 26 is a graph indicating the evolution of tool wear with cutting time (criterion of VB=0.3 mm) for a second set of PcBN variants machining Caldie hardened steel.
Figure 26:
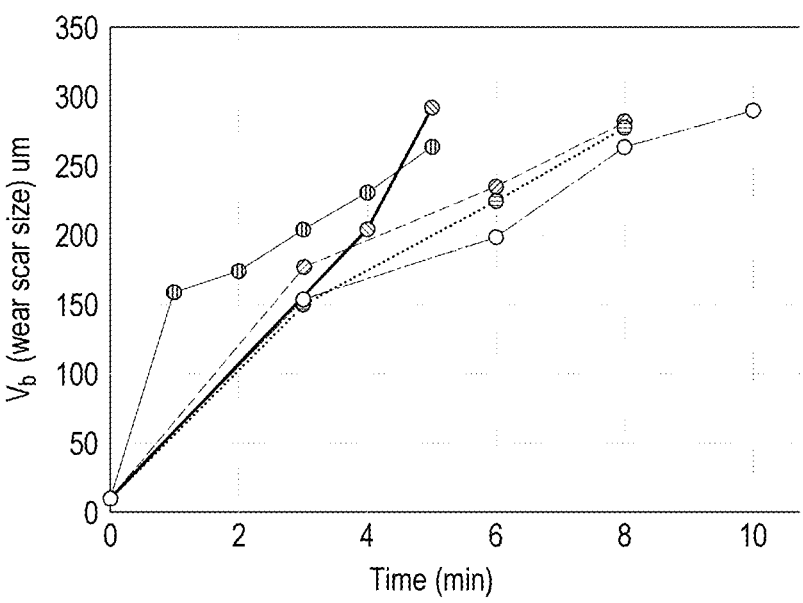

The results are shown in FIGS. 25 and 26.

Referring firstly to FIG. 25, reference sample R1 variant on minute 5 had largest VB=263 μm but also had a micro-fracture with VB=421 μm. The test results show that for this hard turning application, the performance of sample V2, the TiC—VN based PcBN variant, was 80-90% better (×1.9) than the reference materials.

Turning to FIG. 26, the results show that the TiC—ZrN-based variant Z11 had nearly 90% better performance than reference ones, while other TiC—ZrN-based variants also outperformed R1 and R2.

This means that for the Caldie hard turning applications V2 and Z11 variants outperformed the high pressure TiC reference material by up to 90% (×1.9).

For this tool geometry (RNGN090300) flank wear (VB) is the dominant wear criterion and cratering is negligibly small, while for tools having smaller nose radius crater wear (KT) can become more dominant.

(2) Testing by Machining Inconel 718

A pre-screening test was also carried out with the machining of Inconel 718 using the selected PcBN variants under the following cutting conditions: $v_c$=250 m/min, f=0.1 mm/rev, $a_p$=0.3 mm and high pressure coolant @ 70 bar.

Figure 27:
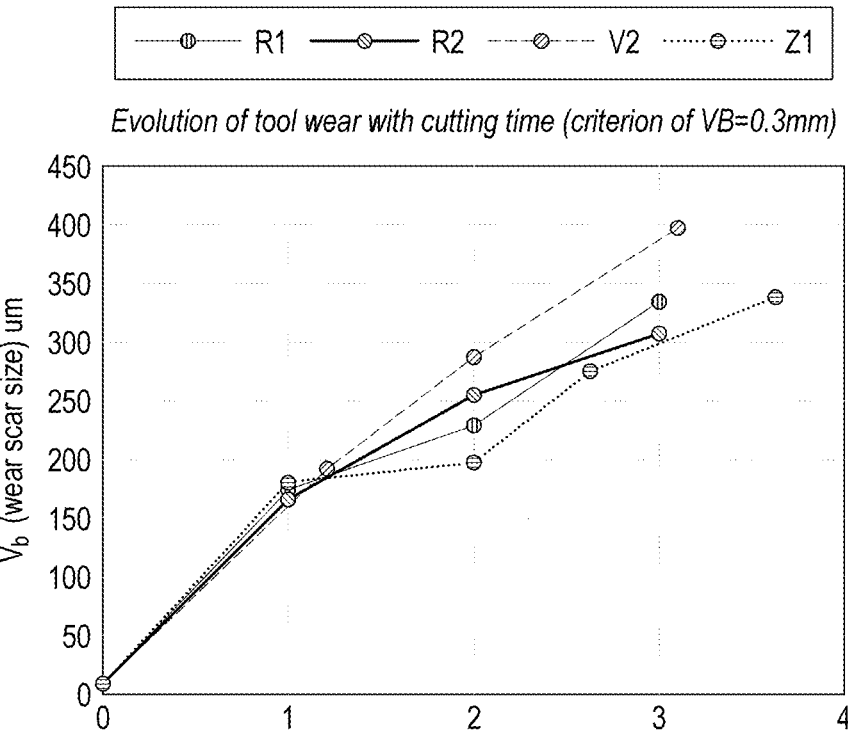
FIG. 27 is a graph indicating the evolution of tool wear with cutting time (criterion of VB=0.3 mm) for a first set of PcBN variants machining Inconel 718.

Results from the testing, shown in FIG. 27, show that TiC—ZrN-based variant Z1 had slightly better performance (up to 15%) than both reference samples, while VN-based variants had 25% worse performance.

Figure 28:
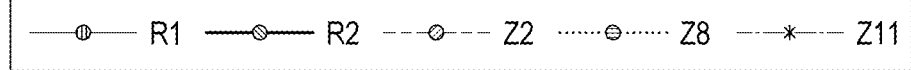
FIG. 28 is a graph indicating the evolution of tool wear with cutting time (criterion of VB=0.3 mm) for a second set of PcBN variants machining Inconel 718.

As can be seen in FIG. 28, TiC—ZrN-based variant Z2 and Z11 had better performance (up to 20%) than both references, while Z8 was comparable.

(3) Testing by Machining Martensitic Stainless Steel

None of the PcBN variants outperformed reference materials in the martensitic stainless steel application.

(4) Testing by Machining Ovako 677 Hardened Steel

The test was performed on a Monforts RNC700 Single Turn horizontal lathe and a standard straight shank tool holder (CCLNL3225). Measurements of surface roughness were done with a surface measurement gauge Mahr MarSurf M300. Wear mode images during testing were generated by an Alicona Infinite focus optical profilometer. An industry standard PCBN material, DSC500, with 50 vol. % cBN was also tested as a benchmark.

The testing was performed on pre-shaped and hardened details of Ovako 677 (Ovatec 677) with outer diameter turning with continuous cut and with a start diameter of 108 mm. The workpiece has conical sides which gives constant time in cut, even when the diameter is decreasing for each pass. Hardening was performed at 900° C. for 20 minutes after heating. Cooling was performed in air. Tempering at 150° C. for 90 minutes was performed within 20 hours after hardening.

The hardness has a uniform distribution of 60-61 HRc in the test part.

The chemical composition of the material Ovako 677 according to the manufacturer is provided in Table 5, with the balance being Fe. In brief, it is 67CrSi4.

TABLE 5

| material composition of Ovako 677 according to the manufacturer | | | | | |
|---|---|---|---|---|---|
| C % | Si % | Mn % | S % | Cr % | Mo % |
| 0.67 | 1.50 | 1.50 | 0.002 | 1.10 | 0.25 |

The cutting parameters were: 170 m/min, 0.15 mm/rev, 0.15 mm, dry machining. The time in cut was 32 seconds per pass. The surface finish measurements were taken after the $1^{st}$, $3^{rd}$, $7^{th}$ and $15^{th}$ pass. The image in Alicona was generated after the $1^{st}$ pass and then every $2^{nd}$ pass. There was a maximum of 15 passes. The tool life criteria was chipping or breakage. The test matrix can be seen in Table 6.

TABLE 6

| Test matrix for Ovako 677 | | | |
|---|---|---|---|
| | Grade 1: Z11 | Grade 2: V2 | Grade 3: DSC500 |
| 170 m/min, 0.15 mm/rev, 0.15 mm, dry machining | | | |

Figure 29:
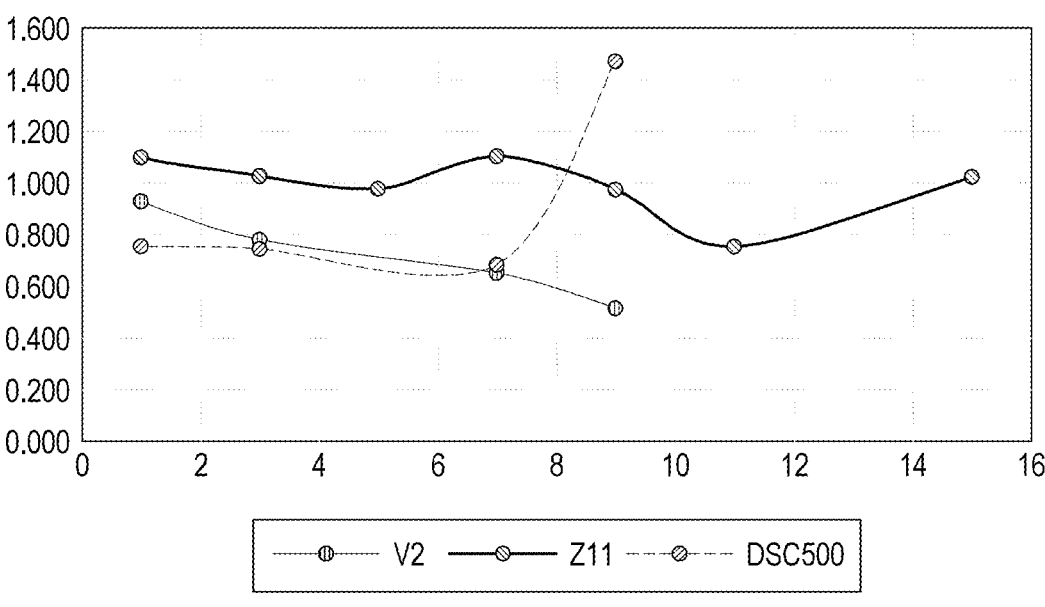
FIG. 29 is a graph indicating Ra as a function of the number of passes for machining of Ovako 677.
Figure 30:
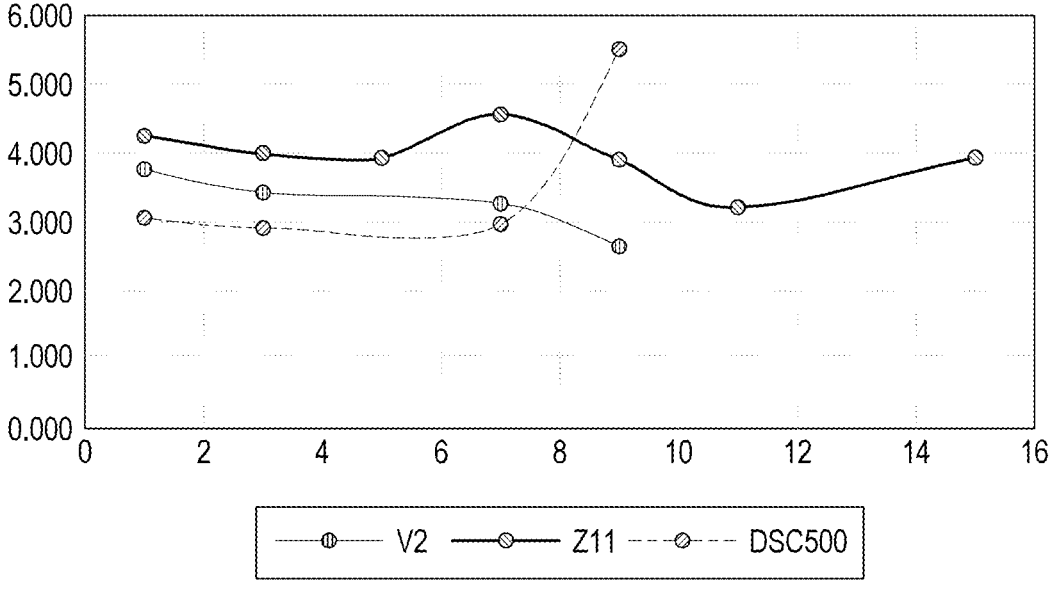
FIG. 30 is a graph indicating Ra as a function of the number of passes for machining of Ovako 677.
Figure 31:
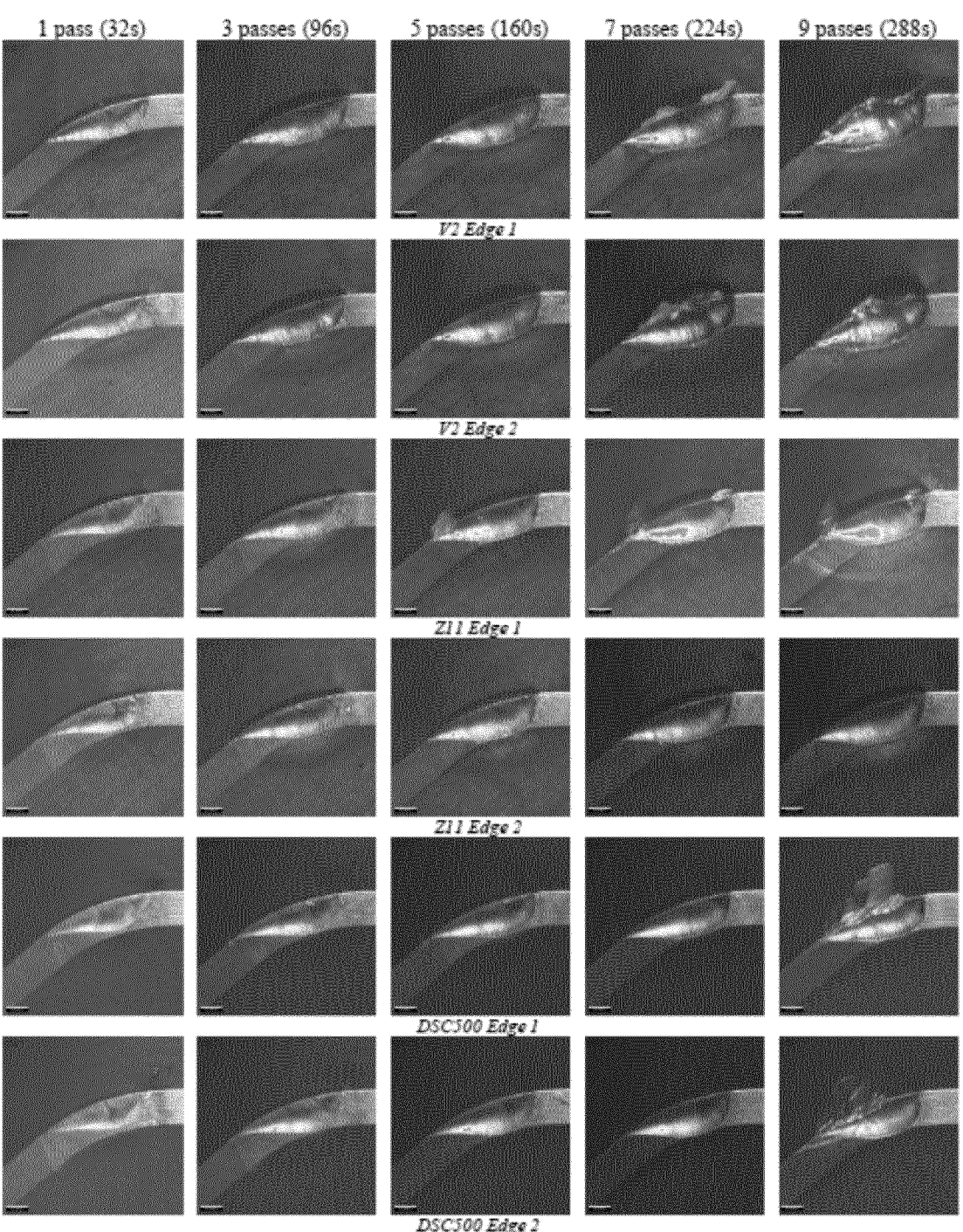
FIG. 31 is a series of SEM micrographs showing tool deterioration of all edges of tested grades from the 1$^{st}$ to the 9$^{th}$ pass.

Both surface feature data in FIGS. 29 and 30, together with wear analysis of pictures in FIG. 31 showed that Z11 produced the best results from a tool life perspective. From a pure surface finish perspective, both V2 and DSC500 showed better surface finish than Z11 until the edge damages are so big that the tests were aborted at 9 passes (288 seconds in cut time).

Figure 32:
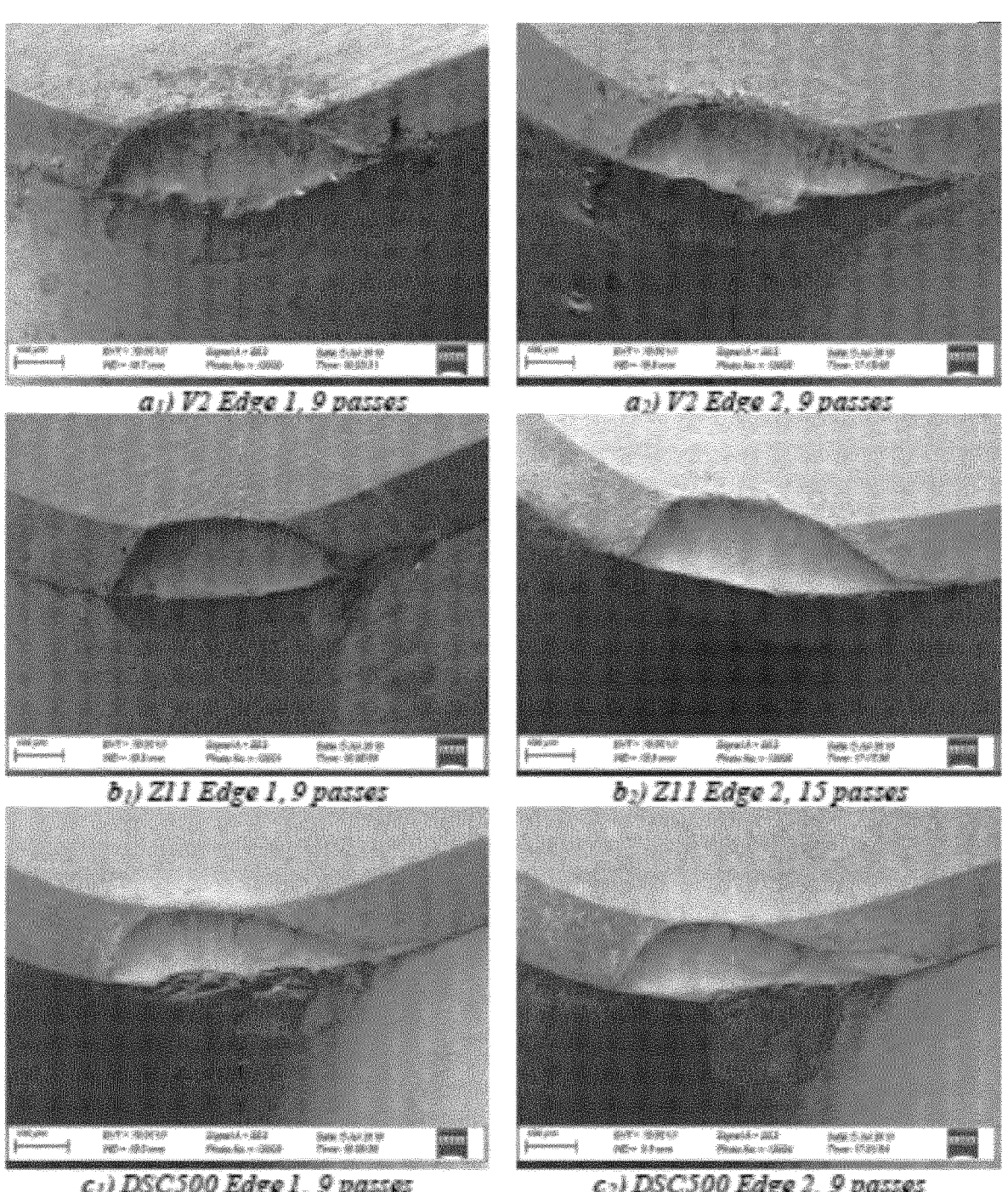
FIG. 32 is a series of SEM micrographs showing the wear of different grades at the end of tool life.
Figure 33:
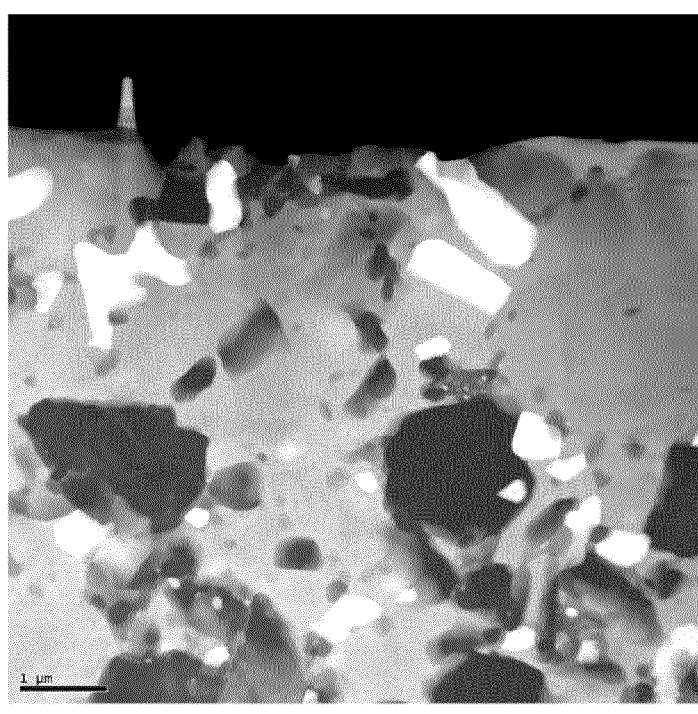
FIG. 33 is a STEM image of sample V2.
Figure 34:
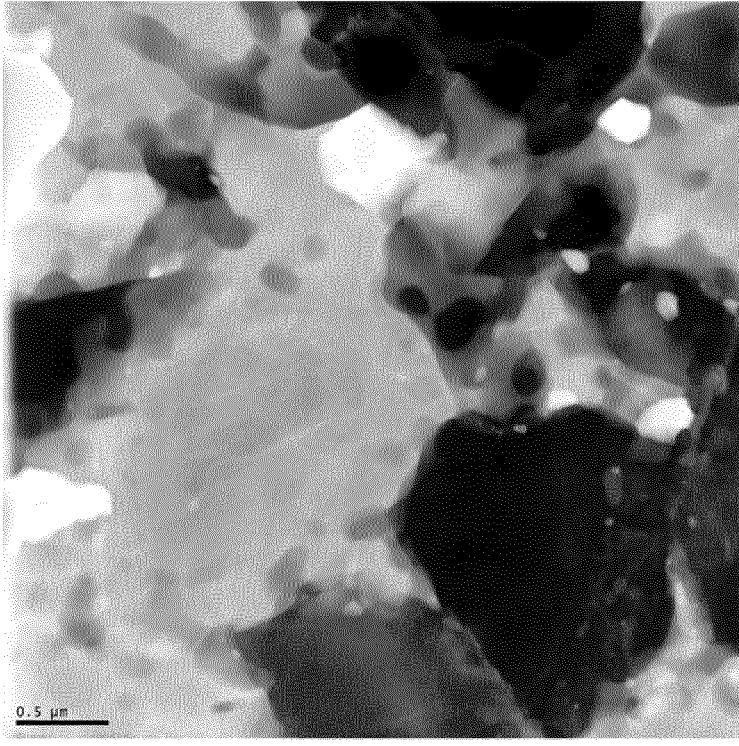
FIG. 34 is a STEM image of further sample V2.
Figure 35:
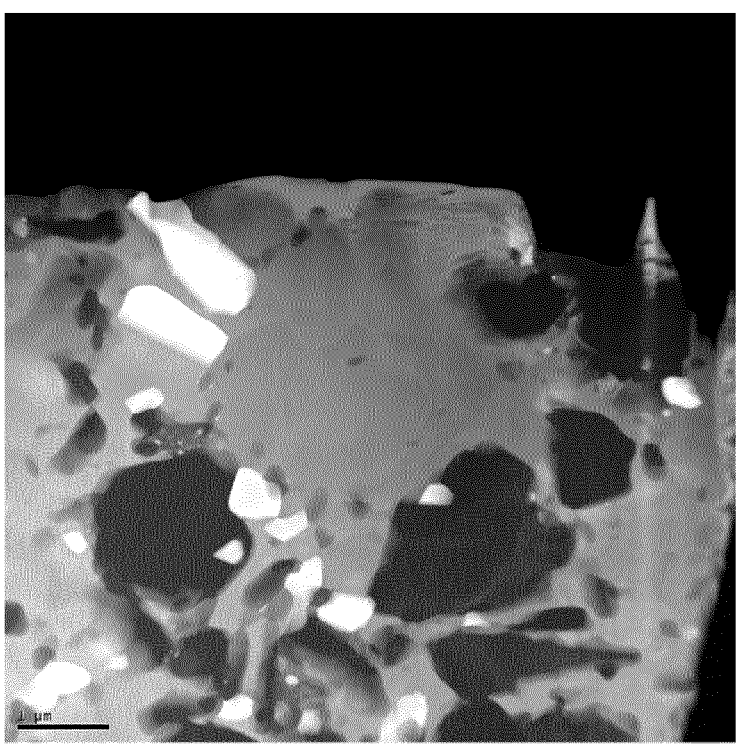
FIG. 35 is a STEM image of a yet further sample V2.
Figure 36:
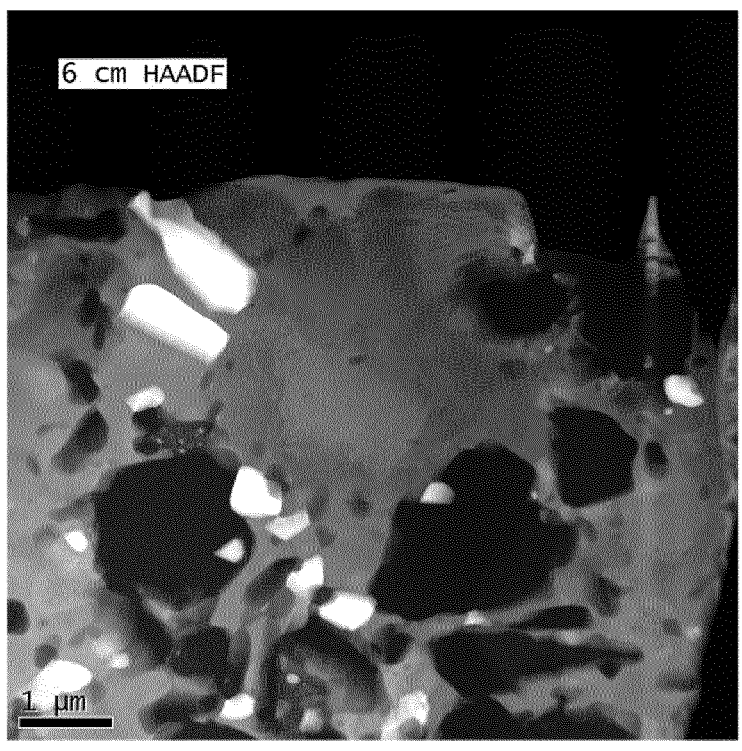
FIG. 36 is a STEM image of an additional sample V2.

FIG. 32a-c showed very similar wear patterns between Edge 1 and Edge 2 of each grade at the end of tool life. The biggest difference between Edge 1 and 2 of Z11 was that Edge 1 did 9 passes and Edge 2 did 15 passes, so the latter was showing the same type of wear but bigger than the first one.

Micro-Structural Analysis

A closer inspection of the microstructure revealed the presence of certain precipitates in the binder microstructure, which can be characterised as being substantially spherical, platelet-like or needle-like. These are summarised in the Table 7.

TABLE 7

| Summary of precipitates found within the microstructure of various samples | | | | | | |
|---|---|---|---|---|---|---|
| SYSTEM, VOL. % | 1750° C. | 1850° C. | 2000° C. | 2150° C. | 2300° C. | 2450° C. |
| 11 cBN:TiC:VN:Al 60:17.5:17.5:5 | No | Weak N2 | Med N2 | Strong N1 | — | — |
| 12 cBN:TiC:VN:Al 60:25:10:5 | Weak N2 | Weak N2 | Med N2 + A2 | Strong N1 + A2 | Strong N1 + N3 + A1 + A2 | — |
| 13 cBN:TiC:ZrN:Al 60:17.5:17.5:5 | No | Weak N2 | Weak N2 | Med N2 + A1 + A2 | Strong N1 + A1 + A2 | — |
| 14 cBN:TiC:ZrN:Al 60:25:10:5 | No | Single N2 | Weak N2 | Strong N1 + A1 + A2 | Strong N1 + A1 + A2 | — |
| 16 cBN:TiN:ZrN:Al 60:17.5:17.5:5 | N2? | N2? | — | No | Weak N2 + A1 | — |
| 17 cBN:TiN:ZrN:Al 60:25:10:5 | N3 + Weak N2 | — | Single N2 + A1 | N2 | Single N2 + A1 | — |
| 18 cBN:TiN:VN:Al 60:17.5:17.5:5 | No | No | A1 | Strong A2 + A1 | N3 | — |
| 20 cBN:ZrN:VN:Al 60:17.5:17.5:5 | No | A1 | A1 | Strong A2 + A1 | Strong A2 + A1 | — |

The key to Table 7 is provided with reference to FIG. 8: FIG. 8a shows a typical A1 feature; FIG. 8b shows a typical A2 feature; FIG. 8c shows a typical N1 feature, FIG. 8d shows a typical N2 feature, and FIG. 8e shows a typical N3 feature.

Figure 37:
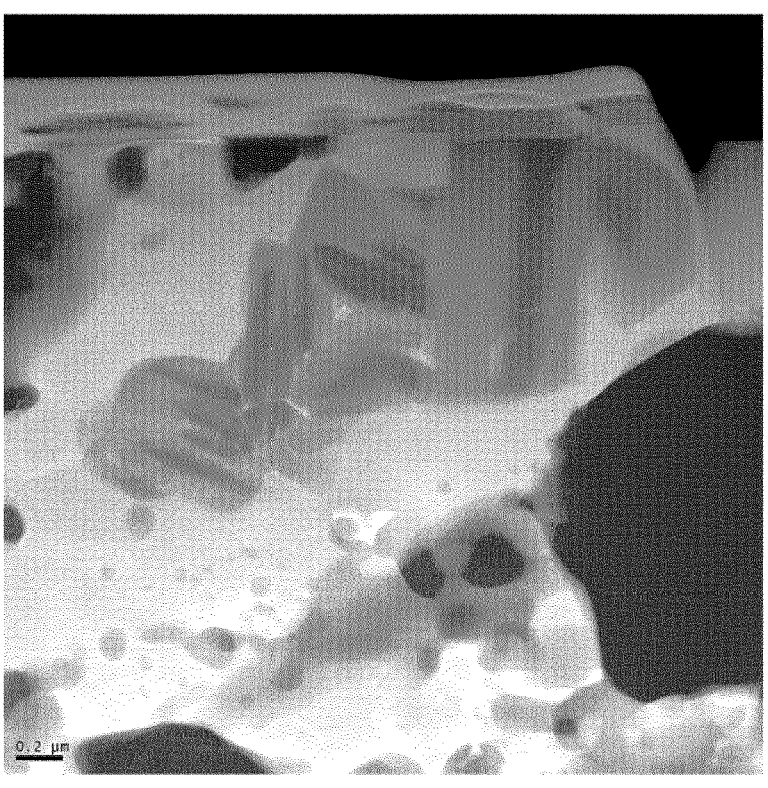
FIG. 37 is a STEM image of sample Z1.
Figure 38:
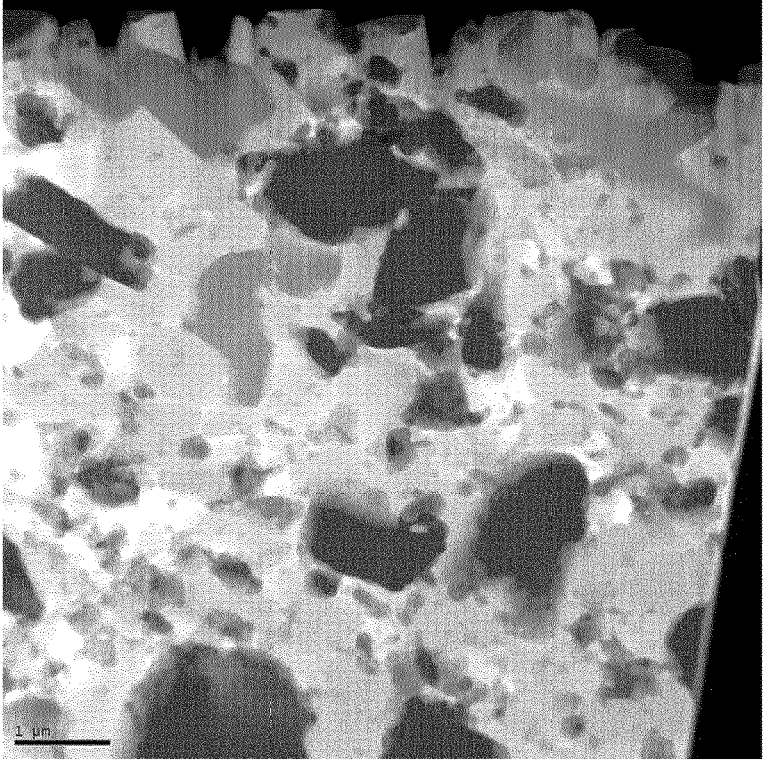
FIG. 38 is a STEM image of sample Z11.

Additional samples for testing were produced under similar high-pressure high-temperature conditions, specifically around 1800° C. and 8 GPa. FIGS. 33 to 36 show generally round solid solution precipitates that were found in V2, and similarly FIG. 38 shows generally round solid solution precipitates found in Z11. FIG. 37 shows needle-like and platelet precipitates found in Z1.

Evidence of W/Ti precipitates were also found in some of the samples. It is thought that contamination caused by WC milling media influences the binder chemistry to some degree. The binder was not free from impurities caused by the milling process.

The PcBN material according to the examples is characterised by both improved fracture toughness due to the presence of the precipitates and significantly better wear resistance than the reference, due to solid solution formation, thereby resulting in prolonged tool life.

The PcBN material as described herein may be used as part of a tool, for use in applications such as cutting, milling, grinding, drilling, or other abrasive applications.

In summary, the inventors have successfully identified several materials which are suitable for use in extreme tooling applications and are viable alternatives to CRMs. In particular, the PCBN material is especially suitable for turning of difficult to machine alloys, and super-alloys and offers many advantages over cemented carbide solutions.

Definitions

As used herein, "PCBN" material refers to a type of super hard material comprising grains of cBN dispersed within a matrix comprising metal or ceramic. PCBN is an example of a super hard material.

As used herein, a "matrix material" is understood to mean a matrix material that wholly or partially fills pores, interstices or interstitial regions within a polycrystalline structure.

The term "matrix precursor powders" is used to refer to the powders that, when subjected to a high pressure high temperature sintering process, become the matrix material.

A multi-modal size distribution of a mass of grains is understood to mean that the grains have a size distribution with more than one peak, each peak corresponding to a respective "mode". Multimodal polycrystalline bodies may be made by providing more than one source of a plurality of grains, each source comprising grains having a substantially different average size, and blending together the grains or particles from the sources. In one embodiment, a PCBN material may comprise cBN grains having a multimodal distribution.

The claims refers to average particle size. This is measured using an equivalent circle diameter (ECD) technique. The ECD distribution of a plurality of loose, unbounded and non-agglomerated grains can be measured by means of laser diffraction, in which the grains are disposed randomly in the path of incident light and the diffraction pattern arising from the diffraction of the light by the grains is measured. The diffraction pattern may be interpreted mathematically as if it had been generated by a plurality of spherical grains, the diameter distribution of which being calculated and reported in terms of ECD. Aspects of a grain size distribution may be expressed in terms of various statistical properties using various terms and symbols. Particular examples of such terms include mean, median and mode. The size distribution can be thought of as a set of values $D_i$ corresponding to a series of respective size channels, in which each $D_i$ is the geometric mean ECD value corresponding to respective channel i, being an integer in the range from 1 to the number n of channels used.

While this invention has been particularly shown and described with reference to embodiments, it will be understood by those skilled in the art that various changes in form and detail may be made without departing from the scope of the invention as defined by the appended claims.

The invention claimed is:

1. A polycrystalline cubic boron nitride, PCBN, material comprising consisting essentially of:
    between 30 and 90 vol. % cubic boron nitride, cBN, particles;
    a matrix material in which the cBN particles are dispersed, the content of the matrix material being between 10 vol. % and 70 vol. % of the PCBN material;
    the matrix material consisting essentially of a titanium compound, an aluminium compound, and precipitates and/or grains containing vanadium said precipitates and/or grains having a shape that is any of substantially spherical, platelet-like or needle-like;

said precipitates and/or grains having a mean largest linear dimension of no more than 1 μm.

2. The PCBN material as claimed in claim 1, wherein the precipitates and/or grains comprise at least one of a nitride, a carbide, a carbonitride and/or a diboride.

3. The PCBN material as claimed in claim 1, wherein grains, and/or the vanadium-containing precipitates and/or grains comprise 10 vol. % -25 vol. % of the PCBN material.

4. The PCBN material as claimed in claim 1, wherein the vanadium-containing precipitates and/or grains comprise 10 vol. % of the PCBN material.

5. The PCBN material as claimed in claim 1, wherein the vanadium-containing precipitates and/or grains have a mean largest linear dimension of no more than 0.50 μm.

6. The PCBN material as claimed in claim 1, wherein the vanadium-containing precipitates and/or grains have a mean largest linear dimension of no more than 0.20 μm.

7. The PCBN material as claimed in claim 1, wherein the matrix material comprises any of titanium carbonitride, titanium carbide, titanium nitride, titanium diboride, aluminium nitride and aluminium oxide.

8. The PCBN material as claimed in claim 7, comprising 10 vol. %-25 vol. % titanium carbide, TiC or titanium nitride, TiN.

9. The PCBN material as claimed in claim 1, further comprising 5 vol. % aluminium, Al, or a compound thereof.

10. The PCBN material as claimed in claim 1, comprising 60 vol. % cubic boron nitride, cBN.

11. The PCBN material as claimed in claim 1, wherein the cBN particles have an average size of between 0.5 μm and 15 82 m.

12. The PCBN material as claimed in claim 1, wherein the PCBN material has a Vickers microhardness of between 26 GPa and 34 GPa.

13. A tool comprising the PCBN material as claimed in claim 1.

14. The tool as claimed in claim 13, which is a tool for cutting, turning, milling, grinding, drilling, or other abrasive applications.

15. The PCBN material as claimed in claim 1, wherein the vanadium-containing precipitates and/or grains comprise 17.5 vol. % of the PCBN material.

16. The PCBN material as claimed in claim 1, wherein the vanadium-containing precipitates and/or grains comprise 25 vol. % of the PCBN material.

* * * * *